(12) United States Patent
Molano et al.

(10) Patent No.: US 6,330,978 B1
(45) Date of Patent: Dec. 18, 2001

(54) ELECTRONIC PURSE CARD VALUE SYSTEM CARD SECURITY METHOD

(75) Inventors: Rafael Molano, Hudson; Lawrence Gianfagna, North Canton; Douglas E. Roth, Bolivar, all of OH (US); Ed Kurtek, Encinitas, CA (US); Alan Goulet, Riverton, UT (US); Robert D. Symonds, Novelty, OH (US); Robert Bradley Gill, Hamilton (CA); William Biwer, Hartland, WI (US); Mike Walsh, Hartford, WI (US); Julie Welsh, Nashotah, WI (US); Richard Gebhard, Oconomowoc, WI (US); Joel Spice-Kopischke, Milwaukee, WI (US)

(73) Assignee: Diebold Incorporated, North Canton, OH (US)

( * ) Notice: Subject to any disclaimer, the term of this patent is extended or adjusted under 35 U.S.C. 154(b) by 0 days.

(21) Appl. No.: 09/067,775

(22) Filed: Apr. 27, 1998

Related U.S. Application Data

(60) Provisional application No. 60/044,423, filed on Apr. 29, 1997.

(51) Int. Cl.[7] .................................................. G06K 19/06
(52) U.S. Cl. ........................... 235/492; 235/380; 235/382
(58) Field of Search ........................... 235/492, 375, 235/382, 380, 482, 487; 902/4, 24

(56) References Cited

U.S. PATENT DOCUMENTS

| | | | |
|---|---|---|---|
| 4,766,293 | * | 8/1988 | Boston ................................. 235/492 |
| 4,992,646 | * | 2/1991 | Collin ................................. 235/375 |
| 5,033,021 | * | 7/1991 | Barakat ................................. 364/900 |
| 5,479,637 | * | 12/1995 | Lisimaque ............................. 235/492 |
| 5,521,362 | * | 5/1996 | Powers ................................. 235/380 |
| 5,566,807 | * | 10/1996 | Morun ................................. 194/217 |
| 5,649,118 | * | 7/1997 | Carlisle et al. ....................... 395/241 |
| 5,767,504 | * | 6/1998 | Menconi ............................... 235/492 |
| 6,119,946 | * | 9/2000 | Teicher ................................. 235/492 |

\* cited by examiner

Primary Examiner—Karl D. Frech
Assistant Examiner—Daniel St. Cyr

(57) ABSTRACT

An electronic purse card value system (10) includes terminal devices (12). Each terminal device includes a processor (26) which is in operative connection with a memory (28) and a modem (36). The processor is further in operative connection with components of the terminal device including a customer interface (14) through which inputs are accepted and outputs are delivered, a card reader (22) and a printing device (30,34). The terminal devices are operative to communicate with host computers (42,44,46) through a communication system (38). The system is operative to carry out transactions in which data representative of value is loaded and unloaded from integrated circuit chips on customer cards (24). Data representative of value is stored in the memories of the cards such that certain value amounts are stored in one memory area while other value amounts are stored in a second memory area. A third amount is calculated which is a function of both the value amounts in the first and second memory areas and the third value is stored in memory on the card.

15 Claims, 60 Drawing Sheets

Configurable Data
Data Elements

| LOCATION | NAME | DATA TYPE | DEFAULT |
|---|---|---|---|
| 0 | Terminal ID | 10N | 0000000001 |
| 1 | LUNO | 9N | 000 |
| 2 | Network Connection Timeout | 2N | 30 |
| 3 | Customer Timeout | 2N | 10 |
| 4 | Minimum Load Amount | $3.2 | 0.00 |
| 1 | Maximum Load Amount | $3.2 | 999.99 |
| 6 | Load Transaction Fee Amount | $2.2 | 0.00 |
| 7 | Transaction Host Telephone Number | 15N | <empty> |
| 8 | Transaction Host 2 Telephone Number | 16N | <empty> |
| 9 | Settlement Host Telephone Number | 16N | <empty> |
| 10 | Settlement Host 2 Telephone Number | 16N | <empty> |
| 11 | Poll/Select Controller ID | 2H (0x20..0x7F) | 00 |
| 12 | Poll/Select Terminal ID | 2H (0x20..0x51) | 00 |
| 13 | Settlement Auto | 1N (0=No, 1=Yes, 2=Emergency Only) | No |
| 14 | Auto Settlement Time | HHMM | <empty> |
| 15 | Auto Settlement Day | 1N (1=Sunday...7=Saturday, 0=Daily) | <empty> |
| 16 | Auto Settlement End Date | MMDDYYYY | <empty> |
| 17 | Success State ID | 3N | 093 |
| 18 | Balance Inquiry Transaction | Yes/No (1=Yes, 0=No) | Yes |
| 19 | Load Card Transaction | Yes/No (1=Yes, 0=No) | Yes |
| 20 | Unload Card Transaction | Yes/No (1=Yes, 0=No) | Yes |
| 21 | Print Transaction Log | Yes/No (1=Yes, 0=No) | Yes |
| 22 | Print Receipt | 1N (0=Never, 1=Always, 2=Prompt) | 2 |
| 23 | Batch Full Threshold (remaining) | 3N (0 to 255) | 10 |
| 24 | Auto Working Key Time | HHMM | 0 |
| 25 | Auto Working Key Internal (Days) | 3N (0 to 255; 0=Never) | 0 |
| 26 | Auto Working Key Window | MMM (0 to 255 [minutes]; 0=Never) | 0 |
| 27 | Health Status Dial-Up | MMM (0 to 255 [minutes]; 0=Never) | 0 |
| 28 | Idle Time Dial-Up | HHH (0 to 255 [hours]; 0=Never) | 0 |
| 29 | Idle Host Disconnect Time | MMM (0 to 255 [minutes]; 0=Immediate) | 0 |
| 30 | Comm Retry Delay | MMM (0 to 255 [minutes]; 0=Immediate) | 3 |
| 31 | Comm Retry Attempts | 1N | 3 |
| 32 | Card Retry Attempts | 1N | 3 |
| 33 | Display Delay | 2N | 3 |
| 34 | ISO Currency Code (for future use) | 3AN | USD |
| 35 | ISO Country Code (for future use) | 3AN | USA |
| 36 | Receipt Header 1 | 24AN | <empty> |
| 37 | Receipt Header 2 | 24AN | <empty> |
| 38 | Receipt Header 3 | 24AN | <empty> |
| 39 | Receipt Header 4 | 24AN | <empty> |
| 40 | System Name | 12AN | Visa Cash |
| 41 | Receipt Trailer 1 | 24AN | <empty> |
| 42 | Receipt Trailer 2 | 24AN | <empty> |
| 43 | Receipt Trailer 3 | 24AN | <empty> |
| 44 | Receipt Trailer 4 | 24AN | <empty> |
| | Funds "On Us" (1-20) Low FIT Range | 6N | <empty> |
| | Funds "On Us" High FIT Range | 6N | <empty> |
| | VISA Cash "On Us" (1-20) Low BIN Range | 6N | <empty> |
| | Visa Cash "On Us" (1-20) High BIN | 6N | <empty> |
| | Error Table (1-25) State Number | 3N | <empty> |
| | Error Table (1-25) Associated Prompt 1 | 3N | <empty> |
| | Error Table (1-25) Associated Prompt 2 | 3N | <empty> |
| | Display Text (1-256) | 16AN | <empty> |

FIG. 3

CONFIGURABLE DATA DESCRIPTIONS

| LOCATION | NAME | DESCRIPTION/USE |
|---|---|---|
| 0 | Terminal ID | Device identifier for settlement host |
| 1 | LUNO | Device identifier for authorization host |
| 2 | Network Connection Timeout | Number of seconds to wait to attempt dial up connection |
| 3 | Customer Timeout | Number of seconds to wait for customer response to prompt |
| 4 | Minimum Load Amount | Smallest allowable amount to load |
| 5 | Maximum Load Amount | Largest allowable amount to load |
| 6 | Load Transaction Fee Amount | Amount charged to funding account for transaction |
| 7 | Transaction Host Telephone Number | Telephone number of main authorization host |
| 8 | Transaction Host 2 Telephone Number | Telephone number of backup authorization host |
| 9 | Settlement Host Telephone Number | Telephone number of main settlement host |
| 10 | Settlement Host 2 Telephone Number | Telephone number of backup settlement host |
| 11 | Poll/Select Controller ID | Group identifier for authorization host |
| 12 | Poll/Select Terminal ID | Device identifier for authorization host |
| 13 | Settlement Auto | Status of auto settlement (0=no, 1=Yes, emergency only) |
| 14 | Auto Settlement Time | Time of day to attempt to auto settle (24 hour time) |
| 15 | Auto Settlement Day | Day of week to auto settle (0=daily, 1=Sunday, 2=Monday, etc,) |
| 16 | Auto Settlement End Date | Date after which auto settlement will not be attempted |
| 17 | Success State ID | State ID returned from authorization host to interpret as approved |
| 18 | Balance Inquiry Transaction | Status of transaction (1=supported, 0=not supported) |
| 19 | Load Card Transaction | Status of transaction (1=supported, 0=not supported) |
| 20 | Unload Card Transaction | Status of transaction (1=supported, 0=not supported) |
| 21 | Print Transaction Log | Status of transaction (1=supported, 0=not supported) |
| 22 | Print Receipt | When to print receipt (0=never, 1=always, 2=user select) |
| 23 | Batch Full Threshold | When there is room for fewer than this number of transactions in the electronic journal, the application attempts emergency auto settlement |
| 24 | Auto Working Key Time | Time of day to attempt to get a new working key (24 hour time) |
| 25 | Auto Working Key Internal (Days) | How often (every x days) to attempt to get a new working key |
| 26 | Auto Working Key Window | How big of window (number of minutes) to attempt to get working key |
| 27 | Health Status Dial-Up | How often (every x minutes) to send health status messages to authorization host |
| 28 | Idle Time Dial-Up | How often (every x hours) to send PING-message to authorization host |
| 29 | Idle Host Disconnect Time | How long (number of minutes) to stay connected to the authorization host with no communication (other than poll/response) before hanging up |
| 30 | Comm Retry Delay | How long (number of minutes) to delay between communication retries |
| 31 | Comm Retry Attempts | Number of attempts to make at communications (total, including initial attempt) |
| 32 | Card Retry Attempts | Number of attempts to make at card function (total, including initial attempt) |
| 33 | Display Relay | Minimum number of seconds to display screen not requiring user input |
| 34 | ISO Currency Code (for future use) | ISO 4217 Identifier for the currency in which the transactions will be conducted |
| 35 | ISO Country Code (for future use) | ISO 3166 Identifier for the country in which the transactions will be conducted |
| 36 - 44 | Receipt Headers/Trailers | Text printed on top and bottom of customer receipts |

FIG. 4

Transaction Flow

| Step | Display | Action [Display ID] |
|---|---|---|
| 0.0a | iq EPIC<br>Copyright 1996<br>DIEBOLD, Inc.<br>Version X.yy | Application banner appears after the operating system banner. This screen remains for one second. |
| 0.0b | Sorry,<br>this machine is<br>temporarily<br>NOT IN SERVICE | TERMINAL: Go to step 0.1.<br>[NOT IN SERVICE] |
| 0.1 | | TERMINAL: Eject card and reset card read counters. Check for alarm conditions. See section on Alarm Conditions for more detail. If no alarms and powering up the terminal, go to step 0.2. If no alarms and not powering up the terminal, check for auto dial for working key:<br>• If the configured auto working key interval is 0, go to step 0.3.<br>• If today minus the time since the last working key was retrieved is less than the configured auto working key interval, go to step 0.3.<br>• If today minus the time since the last working key was retrieved is greater than or equal to the configured auto working key interval, then check the current time:<br>  • If the current time is less than the configured auto working key time, go to step 0.3.<br>  • If the current time is greater than the configured auto working key time PLUS the auto working key window, go to step 0.3.<br>  • If the current time is greater than the configured auto working key time and less than the auto working key time PLUS the auto working key window, go to step 0.2. |
| 0.2 | | TERMINAL: Dial authorization host for new working key. If no communications errors, go to step 0.3. If communications errors, go to step 0.9. See section on communications errors for more detail. |

FIG. 5

| | | |
|---|---|---|
| 0.3 | | TERMINAL: Check for auto settlement:<br>• If there are no transactions in the batch, go to step 0.7.<br>• If there is room for more than the configured batch full threshold number of transactions, go to step 0.7.<br>• If auto settlement is turned off, go to step 0.7.<br>• If auto settlement is turned on or set to emergency only and there is room for fewer than the configured batch full threshold number of transactions, go to step 0.4.<br>• If auto settlement is turned on and the current date is greater than the auto settlement end date, go to step 0.5.<br>• If auto settlement is turned on and set to weekly and today's date matches the auto settlement day and the current time is greater than the auto settlement time and last successful settlement was not today, go step 0.4.<br>• If auto settlement is turned on and set to daily and the current time is greater than the auto settlement time and last successful settlement was not today, go step 0.4.<br>• If auto settlement is turned on and the batch is almost or completely full, go step 0.4. |
| 0.4 | Sorry, this machine is temporarily NOT IN SERVICE | TERMINAL: Dial authorization host for auto settlement. Go to step 0.5. [NOT IN SERVICE] |
| 0.5 | | TERMINAL: If the batch is completely full, go to step 0.6. Otherwise, go to step 0.7. |
| 0.6 | Sorry, this machine is temporarily NOT IN SERVICE | TERMINAL: If the configured health status dial-up time is not 0 and it is less than the time since the last health status message to the authorization host or the health status condition disables the terminal from performing additional transactions, dial authorization host for error status. If the condition disables the terminal from performing additional transactions, the terminal will transmit a general failure status to the host and go to step 0.9. If the condition allows the terminal to continue accepting transactions, go to step 0.10. [NOT IN SERVICE] |
| 0.7 | | TERMINAL: If the printer is low or out or the batch is full or almost full (see step 0.3 above), go to step 0.6. Otherwise, if the configured idle dial-up time is not 0 and it is less than the time since the last connection to the authorization host, go to step 0.8. If the terminal is connected to the host and the time since the last communication with the host (other than poll and response) is greater than the configured idle host disconnect time, hang up the modem. If the configured dial-up time is 0 or if the time since the last connection to the authorization host is less than the configured idle dial-up time, go to step 0.10. |

FIG. 6

| | | |
|---|---|---|
| 0.8 | Sorry, this machine is temporarily NOT IN SERVICE | TERMINAL: Dial authorization host for idle dial up. Go to step 0.10.<br>[NOT IN SERVICE] |
| 0.9 | Sorry, this machine is currently NOT IN SERVICE | USER: Press keys to access Administrative Functions.<br>TERMINAL: Check for Alarm conditions. Wait for administrative key press. If a key is pressed, go to step 0.0 in Section 3.1 (Administrative Access). NOTE: the terminal cannot process transactions and will only allow access to Administrative Functions.<br>[NOT IN SERVICE] |
| 0.10 | Visa Cash<br><br>INSERT CARD | TERMINAL: Go to step 0.11.<br>[MAIN] |
| 0.11 | | USER: Insert card to begin transactions. Press keys to access Administrative Functions.<br>TERMINAL: Wait for card insertion or administrative key press. If a key is pressed, go to step 0.0 in Section 3.1 (Administrative Access). If card inserted, go to step 1.0. If no event occurs within the Customer Timeout period, go to step 0.1. |
| 1.0 | | TERMINAL: When card is inserted, check card for chip and magnetic data. If the card does not have a valid Visa Cash application, it is determined to have an invalid chip.<br>• If there is a valid chip on the card with valid MSI data go to step 1.1.<br>• If there is a valid chip on the card and valid account information on the magnetic strip, go to step 1.1<br>• If there is a valid chip on the card and a magnetic strip, but the magnetic strip was not readable, go to step 1.2.<br>• If there is a valid chip on the card and a magnetic strip, but the account number read is invalid, go to step 1.3.<br>• If there is a valid chip on the card and no magnetic strip, go to step 1.8.<br>• If there is no valid chip on the card and valid account information on the magnetic strip, go to step 1.1<br>• If there is no valid chip on the card and a magnetic strip, but the magnetic strip was not readable, go to step 1.4.<br>• If there is no valid chip on the card and a magnetic strip, but the account number read is invalid, go to step 2.6.<br>• If there is no valid chip on the card and no magnetic strip, go to step 2.4. |
| 1.1 | PLEASE ENTER YOUR PERSONAL ID NUMBER<br><br>\*\*\*\* | USER: Enter PIN followed by ENTER.<br>TERMINAL: Echo key presses with \*. When ENTER pressed, go to step 1.5. If CANCEL pressed following the first key press of the ID, clear all keys pressed and re-prompt. If CANCEL pressed before any keys pressed for PIN, go to step 9.9.<br>[ENTER PIN] |

FIG. 7

| | | |
|---|---|---|
| 1.2 | MAGNETIC STRIP UNREADABLE<br>Retry Card Read ><br>Continue > | USER: Press F7 to retry reading this card's magnetic data. Press F8 to continue as "chip-only" card.<br>TERMINAL: Increment bad card read counter. If F7 pressed, eject card, go to step 1.4. If F8 pressed, go to step 1.8. If CANCEL pressed, go to step 9.9.<br>[GOOD CHIP BAD MAG] |
| 1.3 | INVALID ACCOUNT NUMBER<br>Select New Card ><br>Continue > | USER: Press F7 to try a different card. Press F8 to continue as "chip-only" card.<br>TERMINAL: If F7 pressed, eject card, go to step 0.10. If F8 pressed, go to step 1.9. If CANCEL pressed, go to step 9.9.<br>[GOOD CHIP BAD PAN] |
| 1.4 | | TERMINAL: Increment bad card read counter. If counter is greater than the configured Retry Attempts, go to step 2.5. Otherwise go to step 2.3. |
| 1.5 | | TERMINAL: Check printer status. If status OK, go to step 1.7. If not, go to step 1.6. |
| 1.6 | PRINTER NOT AVAILABLE<br>Continue ><br>Exit > | USER: Press F7 to continue or F8 to cancel the transaction.<br>TERMINAL: If F7 pressed, go to step 1.7. If F8 or CANCEL pressed, go to step 9.9.<br>[NO PRINTER CONT] |
| 1.7 | | TERMINAL: If card has valid chip, go to step 2.0. If not, go to step 2.2. |
| 1.8 | | TERMINAL: Check printer status. If status OK, go to step 2.1. If not, go to step 1.9. |
| 1.9 | CURR BAL $123.45<br><br>Continue ><br>Exit > | USER: Press F8 to get card back, and F7 to perform a transaction.<br>TERMINAL: If F8 or CANCEL pressed, go to step 9.9. If F7 pressed, go to step 1.10.<br>[VCC BAL NO PRINTER] |
| 1.10 | | TERMINAL: If Unload is configured, go to step 1.11. If not, go to step 1.12. |
| 1.11 | PLEASE TAKE CARD<br>Insert ATM or<br>Credit Card<br>For Load/Unload | TERMINAL: Eject card and go to step 0.11.<br>[BANK CARD LOAD/UNLOAD] |
| 1.12 | PLEASE TAKE CARD<br>Insert ATM or<br>Credit Card<br>For Load | TERMINAL: Eject card and go to step 0.11.<br>[BANK CARD LOAD] |

FIG. 8

| | | |
|---|---|---|
| 2.0 | ACCOUNT BALANCE > <br> CARD BALANCE > <br> LOAD CARD > <br> UNLOAD CARD > | USER: Press F7 to Load Card, F8 to Unload Card, F5 to do a Balance Inquiry for a funding card account, F6 to do a Balance Inquiry on the Visa Cash Card Chip. <br> TERMINAL: If F7 pressed, go to step 4.0a. If F8 pressed, go to step 3.0. If F5 pressed, go to step 5.0. If F6 pressed, go to step 2.7. If CANCEL pressed, go to step 9.9. <br> [FULL MENU] <br> NOTE: only configured transactions are displayed. Transacitons will be displayed on the lines shown. No attempt will be made to "justify" the configured/displayed transactions to the top or bottom lines. Keys pressed for transactions that are not configured "on" are ignored. |
| 2.1 | CURR BAL $123.45 <br> Print Tran Log <br> Other Transactn> <br> Exit | USER: Press F6 to print the transaction log. F7 to perform another transaction, F8 to get card back. <br> TERMINAL: If F6 pressed, go to step 6.0. If F7 pressed, go to step 1.10. If F8 or CANCEL pressed, go to step 9.9. <br> [VCC BAL MENU] <br> NOTE: only configured transactions are displayed. Transactions will be displayed on the lines shown. No attempt will be made to "justify" the configured/displayed transactions to the top or bottom lines. Keys pressed for transactions that are not configured "on" are ignored. |
| 2.2 | ACCOUNT BALANCE > <br><br> LOAD CARD > <br> UNLOAD CARD > | USER: Press F5 to Load Card, F6 to Unload Card, F7 to do a Balance Inquiry for a funding card account. <br> TERMINAL: If F7 pressed, go to step 4.0a. If F8 pressed, go to step 3.0. If F5 pressed, go to step 5.0. If CANCEL pressed, go to step 9.9. <br> [FUND MENU] <br> NOTE: only configured transactions are displayed. Transactions will be displayed on the lines shown. No attempt will be made to "justify" the configured/displayed transactions to the top or bottom lines. Keys pressed for transactions that are not configured "on" are ignored. |
| 2.3 | CANNOT READ CARD <br> Take card and re- <br> insert ATM or <br> credit card | USER: Take card. <br> TERMINAL: Eject card and go to step 0.11. <br> [CARD RETRY] |
| 2.4 | CANNOT READ CARD <br> Please try <br> another card | USER Take card. <br> TERMINAL: Eject card and go to step 1.0. <br> [BAD CARD] |
| 2.5 | TOO MANY RETRIES <br> Card cannot <br> be read | TERMINAL: Eject card, wait for configured Display Delay and go to step 9.9. <br> [MAX CARD RETRIES] |
| 2.6 | INVALID <br> ACCOUNT NUMBER <br> Please try <br> another card | USER: Take card. <br> TERMINAL: Eject card, wait for configured Display Delay and go to step 0.10. <br> [BAD PAN] |

FIG. 9

| | | |
|---|---|---|
| 2.7 | | TERMINAL: If printer is working, go to step 2.8. If not, go to step 2.9. |
| 2.8 | CURR BAL $123.45<br><br>Print Tran Log  ><br>Continue        ><br>Exit              > | USER: Press F7 to return to previous menu. F6 to print the transaction log, F8 to get card back.<br>TERMINAL: If F6 pressed, go to step 6.0. If F7 pressed, go to step 2.0. If F8 or CANCEL pressed, go to step 9.9.<br>[VCC BAL TRAN]<br>NOTE: only configured transactions are displayed. Transactions will be displayed on the lines shown. No attempt will be made to "justify" the configured/displayed transactions to the top or bottom lines. Keys pressed for transactions that are not configured "on" are ignored. |
| 2.9 | CURR BAL $123.45<br><br>Continue      ><br>Exit             > | USER: Press F7 to return to previous menu, F8 to get card back.<br>TERMINAL: If F7 pressed, go to step 2.0. If F8 to CANCEL pressed, go to step 9.9.<br>[VCC BAL TRAN NO PRINTER] |
| 3.0 | | TERMINAL: If the card is not within a range specified in the funds "on us" configuration (a.k.a. FIT table), go to step 3.1. Otherwise, go to step 3.4 |
| 3.1 | INVALID CARD FOR THIS TRANSACTION AT THIS TERMINAL | TERMINAL: Wait for configured display Delay and go to step 9.8.<br>[UNLOAD NOT ON US] |
| 3.3 | UNLOAD<br><br>Please try<br>another card | USER: Take card. Insert new card.<br>TERMINAL: Eject card and wait for card insertion. When card is inserted, check for valid chip and magnetic data. Go to step 3.0. If CANCEL pressed, go to step 9.9.<br>[UNLOAD NEW CARD] |
| 3.4 | UNLOAD TO:<br><br>Checking      ><br>Savings        ><br>Credit Card  > | USER: Select account to unload card into. Press F6 for Checking Account, F7 for Savings Acct, F8 for Credit Card.<br>TERMINAL: Set account selection based on key pressed. If there is a Visa Cash application on the card that is within a range specified in the VCC "on us" Configuration (a.k.a. BIN Table) and has a balance greater than the minimum transfer amount, go to step 3.5. Otherwise, go to step 3.6. If CANCEL pressed, go to step 9.9.<br>[UNLOAD ACCT MENU] |
| 3.5 | UNLOAD FROM<br><br>Different card  ><br>This card         > | USER: Select card to unload from. Press F7 for a different Visa Cash card, F8 for the Visa Cash card currently in the reader.<br>TERMINAL: If F7 pressed, go to step 3.6. If F8 pressed, go to step 3.9. If CANCEL pressed, go to step 9.9.<br>[UNLOAD CARD MENU] |

FIG. 10

| | | |
|---|---|---|
| 3.6 | UNLOAD<br>Please insert<br>[BANK NAME]<br>Visa Cash card | USER: Take card. Insert new card.<br>TERMINAL: Eject card and wait for card insertion. When card is inserted, check for valid chip data. If there is a Visa Cash application on the card that is not within a range specified in the VCC "on us" Configuration (a.k.a. BIN Table), go to step 3.7. If the card's balance is less than the minimum transfer amount, go to step 3.8. Otherwise, go to step 3.9. If CANCEL pressed, go to step 9.9.<br>[UNLOAD NEW CARD] |
| 3.7 | INVALID CARD FOR THIS TRANSACTION AT THIS TERMINAL | TERMINAL: Wait for configured Display Delay and go to step 3.6.<br>[UNLOAD NOT VCC] |
| 3.8 | CURR BAL $123.45<br>Balance too small to perform unload | TERMINAL: Wait for configured Display Delay and go to step 9.3.<br>[UNLOAD BAL TOO SMALL] |
| 3.9 | CURR BAL $123.45<br>ENTER UNLOAD<br>AMOUNT OR<br>PRESS FOR ALL | USER: Press F8 to unload entire balance. Press any numeric key to begin entry of unload amount.<br>TERMINAL: If F8 pressed, go to step 3.13. If a numeric key is pressed, go to step 3.10. If CANCEL pressed, go to step 9.9.<br>[UNLOAD AMT MENU] |
| 3.10 | CURR BAL $123.45<br>ENTER UNLOAD<br>AMOUNT<br>USD $    0.00 | USER: Press enter when unload has been entered.<br>TERMINAL: If amount entered is less than minimum, go to step 3.11. If amount entered is greater than maximum unload, go to step 3.12. If amount is valid, go to step 7.0. If CANCEL pressed, go to step 9.9.<br>[UNLOAD AMT ENTRY] |
| 3.11 | INVALID AMOUNT<br>Amount must be greater than $0.00 | TERMINAL: Wait for configured Display Delay and go to step 3.9.<br>[AMT TOO SMALL] |
| 3.12 | INVALID AMOUNT<br>Amount must be less than<br>$0.00 | TERMINAL: Wait for configured Display Delay and go to step 3.9.<br>[AMT TOO BIG] |
| 3.13 | Visa Cash UNLOAD<br>USD $ 123.45<br>AMOUNT CORRECT?<br><YES    NO> | USER: Press F4 to unload this amount. Press F8 to unload a different amount.<br>TERMINAL: If F4 pressed, go to step 7.0. If F8 or CANCEL pressed, go to step 3.9<br>[UNLOAD AMT VERIFY] |

FIG. 11

| | | |
|---|---|---|
| 4.0a | LOAD FROM<br>Checking    ><br>Savings     ><br>Credit Card  > | USER: Select account to load card from. Press F6 for Checking Account, F7 for Savings Acct, F8 for Credit Card.<br>TERMINAL: Set account selection based on key pressed. If there is a Visa Cash application on the card, go to step 4.1. If not, go to step 4.2. If the balance is equal to the maximum balance, go to step 4.0b. If CANCEL pressed, go to step 9.9<br>[LOAD ACCT MENU] |
| 4.0b | CURR BAL $123.45<br>Is at maximum<br>        CONTINUE ><br>        CANCEL   > | USER: Cancel transaction or continue with a different Visa Cash card. Press F7 to continue with a Visa Cash card, or F8 to Cancel.<br>TERMINAL: If F7 pressed, go to step 4.2. If F8 or CANCEL pressed, go to step 9.9. |
| 4.1 | LOAD TO<br><br>Different card ><br>This card     > | USER: Select card to load to. Press F7 for a different Visa Cash card, F8 for the Visa Cash card currently in the reader.<br>TERMINAL: If F7 pressed, go to step 4.2. If F8 pressed, go to step 4.5. If CANCEL pressed, got to step 9.9.<br>[LOAD CARD MENU] |
| 4.2 | LOAD<br>Please insert<br>Visa Cash Card | USER: Take card. Insert new card.<br>TERMINAL: Eject card and wait for card insertion. When card is inserted, check for valid chip data. If the card does not have a Visa Cash application, go to step 4.3. If the Visa Cash card has expired, go to step 4.11. If balance is greater than the maximum balance minus the minimum transfer, go to step 4.4. Otherwise, go to step 4.5. If CANCEL pressed, go to step 9.9.<br>[LOAD NEW CARD] |
| 4.3 | INVALID CARD FOR THIS TRANSACTION AT THIS TERMINAL | TERMINAL: Wait for configured Display Delay and go to step 4.2.<br>[LOAD NOT VCC] |
| 4.4 | CURR BAL $123.45<br>Too large to<br>perform load | TERMINAL: Wait for configured Display Delay and go to step 9.8.<br>[LOAD BAL TOO BIG] |
| 4.5 | CURR BAL $123.45<br>MAX LOAD $123.45<br>ENTR LOAD AMT OR<br>PRESS FOR MAX  > | USER: Press F8 to load maximum. Press any numeric key to begin entry of load amount.<br>TERMINAL: If F8 pressed, go to step 4.9. If a numeric key is pressed, go to step 4.6. If CANCEL pressed, go to step 9.9.<br>[LOAD AMT MENU] |
| 4.6 | CURR BAL $123.45<br>MAX LOAD $123.45<br>ENTR LOAD AMOUNT<br>USD $   0.00 | USER: Press enter when load has been entered.<br>TERMINAL: If amount entered is less than minimum, go to step 4.7. If amount entered is greater than maximum load, go to step 4.8. If amount is valid, go to step 7.0. If CANCEL pressed, go to step 9.9.<br>[LOAD AMT ENTRY] |

FIG. 12

| | | |
|---|---|---|
| 4.7 | INVALID AMOUNT<br>Amount must be<br>greater than $0.00 | TERMINAL: Wait for configured Display Delay and go to step 4.5.<br>[AMT TOO SMALL] |
| 4.8 | INVALID AMOUNT<br>Amount must be<br>less than<br>$0.00 | TERMINAL: Wait for configured Display Delay and go to step 4.5.<br>[AMT TOO BIG] |
| 4.9 | Visa Cash LOAD<br>USD $123.45<br>AMOUNT CORRECT?<br><YES      NO> | USER: Press F4 to load this amount. Press F8 to load a different amount.<br>TERMINAL: If F4 pressed, go to step 7.0. If F8 pressed, go to step 4.5. If CANCEL is pressed go to 9.9.<br>[LOAD AMT VERIFY] |
| 4.10 | LOAD<br>Please try<br>another ATM or<br>credit card | USER: Take card. Insert a new funds card<br>TERMINAL: Eject card and wait for card insertion. When funds card is inserted, check for valid chip and magnetic data. Go to step 4.0. If CANCEL pressed, go to step 9.9.<br>[LOAD NEW CARD] |
| 4.11 | Visa Cash<br>CARD EXPIRED<br>Cannot<br>perform load | TERMINAL: Eject Card and go to step 9.8.<br>[VCC EXPIRED] |
| 5.0 | BALANCE FROM<br>Checking    ><br>Savings     ><br>Credit Card   > | USER: Select account to get balance from. Press F6 for Checking Account, F7 for Savings Acct, F8 for Credit Card.<br>TERMINAL: Set account selection based on key pressed. Go to step 7.0.<br>If CANCEL pressed, go to step 9.9.<br>[ACCT BAL MENU] |
| 6.0 | | TERMINAL: If there is successful purchase data in the transaction log, go to step 9.2. If not, go to step 6.1. |
| 6.1 | Visa Cash<br><br>NO DATA IN<br>TRANSACTION LOG | TERMINAL: Wait for configured Display Delay and go to step 1.7.<br>[NO TRAN LOG] |
| 7.0 | Visa Cash<br><br>Please Wait<br>Communicating . . . | TERMINAL: Dial authorization host for request. Communication errors employ a retry scheme where 3 (non-configurable) total attempts are made at any level before erroring out. If communication was unsuccessful, go to step 7.2. If communication was successful, go to to step 7.1.<br>[COMMUNICATING] |
| 7.1 | | TERMINAL: Check next state in reply. If equal to the configured successful state id, go to step 8.0. Otherwise, go to step 7.2 |

FIG. 13

| | | |
|---|---|---|
| 7.2 | tran<br>REQUEST FAILED<br>*error prompt 1*<br>*error prompt 2* | TERMINAL: Update statistics. Wait for configured Display Delay. If the state ID is equal to the configured re-enter PIN state ID, go to step 7.3. If the state ID is equal to the configured NSF state ID go to step 7.6. Otherwise, go to step 9.9. See section on ATM Error States for more detail<br>[REQ FAIL]<br>*tran=transaction request attempted*<br>*error prompt 1 & 2=configured prompts associated with given error state or default* |
| 7.3 | | TERMINAL: If PIN retries greater than configurable number, go to step 7.5. Otherwise, go to step 7.4. |
| 7.4 | PLEASE ENTER<br>YOUR PERSONAL<br>ID NUMBER<br><br>\*\*\*\* | USER: Enter PIN followed by ENTER.<br>TERMINAL: Echo key presses with \*. When ENTER pressed, go to step 7.0. If CLEAR pressed following the first key press of the ID, clear all keys pressed and re-prompt. If CANCEL pressed before any keys pressed for PIN, go to step 9.9.<br>[ENTER PIN] |
| 7.5 | TOO MANY ATTEMPTS | TERMINAL: Wait for configured Display Delay and go to step 9.9.<br>[TOO MANY TRIES] |
| 7.6 | | TERMINAL: If transaction request was Load, go to step 4.10. If transaction request was Unload, go to step 9.9. (NOTE: the transaction request should never be Unload when NSF is returned.) |
| 8.0 | | TERMINAL: If transaction request was Account Balance Inquiry, go to step 9.0. If transaction request was Unload or Load, update the card. Transmit completion message to authorization host indicating successful or failed card update. If failed, go to step 8.1. If successful, go to step 8.2. If unknown (no S3), assume successful and go to step 8.2. |
| 8.1 | tran<br>REQUEST FAILED<br>*error prompt 3*<br>*error prompt 2* | TERMINAL: Update statistics. Wait for configured Display Delay. Go to step 9.9.<br>[REQ FAIL]<br>*tran=transaction request attempted*<br>*error prompt 1 & 2=configured prompts associated with card update error* |
| 8.2 | | TERMINAL: Save transaction data to the journal. (If card update status is unknown, S3 will be blank.) Update statistics and totals. Increment transaction counter. Go to step 9.0. |
| 9.0 | | TERMINAL: If the terminal is configured to print receipt always go to step 9.2. If the terminal is configured to prompt for print receipt, go to step 9.1. Otherwise, go to step 9.3. |

FIG. 14

| | | |
|---|---|---|
| 9.1 | tran SUCCESS<br>USD $ 123.45<br>PRINT RECEIPT?<br><YES      NO> | USER: Press F4 for receipt or F8 to get card back.<br>TERMINAL: If F4 pressed, go to step 9.2. If F8 pressed, go to step 9.3. If CANCEL pressed go to 9.8.<br>[PRINT RECEIPT YN]<br>*tran=transaction request attempted (LOAD, UNLOAD, ACCT BAL)* |
| 9.2 | Visa Cash<br><br>Please Wait<br>Printing.... | TERMINAL: Print the receipt or transaction log. When printing transaction log, include successful purchases, and both successful and unsuccessful load and unload transactions. When complete, go to step 9.3.<br>[PRINTING] |
| 9.3 | | TERMINAL: If card in reader is not a funds card, go to step 9.8. If card in reader is a funds card, go to step 9.4. |
| 9.4 | Visa Cash<br>ANOTHER<br>TRANSACTION?<br><YES      NO> | USER: Press F4 for another transaction or F8 to get card back.<br>TERMINAL: If F4 pressed, go to step 1.7. If F8 or CANCEL pressed, go to step 9.8.<br>[ANOTHER TRAN YN] |
| 9.8 | | TERMINAL: Eject card. Go to step 10.0 |
| 9.9 | TRANSACTION<br>CANCELED<br><br>PLEASE TAKE CARD | TERMINAL: Eject card. Wait for configured Display Delay. Go to step 10.0<br>[TRAN CANCELED] |
| 10.0 | THANK YOU<br>for using<br>Visa Cash<br>PLEASE TAKE CARD | TERMINAL: If paper flow low or out, transmit message to authorization host. If paper OK, wait for configured Display Delay. When complete, go to step 0.1.<br>[THANK YOU] |

FIG. 15

LOAD RECEIPT

The following shows the receipt format for a load transaction.

```
123456789012345678901234
```

| | |
|---|---|
| SMART CARD SOLUTIONS<br>810 CARDINAL LANE<br>HARTLAND, WI 53029<br>414.369.3400 | Ruler (not printed)<br>Header line 1<br>Header line 2<br>Header line 3<br>Header line 4 |
| Terminal Numb 1234567890 | |
| 123-123456 | Journal Rec Number - Transaction Number |
| 12/31/1999      11:59 PM | Time/date |
| Visa Cash<br>LOAD<br>CASH ADVANCE TO CARD<br>CASH WITHDRAWAL TO CARD<br>FROM SAVINGS<br>FROM CHECKING | System Name<br>Load<br>Load from Credit Card<br>Load from Debit Card<br>Load from debit card withdrawal from savings<br>Load from debit card withdrawal from checking |
| CARD NO xxxxxxxxxxxxx1234<br>VCC NO 1234567890123456<br>OLD VCC BAL       $123.45<br>LOAD AMOUNT   +$123.45<br>NEW VCC BAL       $123.45<br>FEE AMOUNT       $123.45 | For security, part of account number is xxxxd out |
| THANK YOU!<br>FOR USING<br>Visa Cash CARD | Trailer Line 1<br>Trailer Line 2<br>Trailer Line 3<br>Trailer Line 4 |

FIG. 16

UNLOAD RECEIPT

The following shows the receipt format for an unload transaction.

| Receipt | Description |
|---|---|
| 123456789012345678901234 | Ruler (not printed) |
| SMART CARD SOLUTIONS | Header line 1 |
| 810 CARDINAL LANE | Header line 2 |
| HARTLAND, WI 53029 | Header line 3 |
| 414.369.3400 | Header line 4 |
| Terminal Numb 1234567890 | |
| 123-123456 | Journal Rec Number - Transaction Number |
| 12/31/1999    11:59 PM | Time/date |
| Visa Cash | System Name |
| UNLOAD | Unload |
| CASH CARD TO CREDIT CARD | Unload to Credit Card |
| CASH CARD TO SAVINGS | Unload to savings |
| CASH CARD TO CHECKING | Unload to checking |
| CARD NO xxxxxxxxxxxxx1234 | For security, part of account number is xxxxd out |
| VCC NO 1234567890123456 | |
| OLD VCC BAL        $123.45 | |
| UNLOAD AMOUNT   -$123.45 | |
| NEW VCC BAL       $123.45 | |
| FEE AMOUNT        $123.45 | Trailer Line 1 |
| OR USING | Trailer Line 2 |
| Visa Cash CARD | Trailer Line 3 |
|  | Trailer Line 4 |

FIG. 17

Balance Inquiry (Visa Cash Card) Receipt

| | |
|---|---|
| 123456789012345678901234 | Ruler (not printed) |
| SMART CARD SOLUTIONS | Header line 1 |
| 810 CARDINAL LANE | Header line 2 |
| HARTLAND, WI 53029 | Header line 3 |
| 414.369.3400 | Header line 4 |
| | |
| Terminal Numb 1234567890 | |
| | |
| 12/31/1999    23:59:59 | Time/date |
| | |
| Visa Cash | System Name |
| BALANCE INQUIRY | balance inquiry form card |
| VISA CASH CARD | |
| | |
| VCC NO 1234567890123456 | Visa Cash card balance inquiry |
| VCC BAL    $123.45 | Visa Cash card Balance inquiry |
| | |
| THANK YOU! | Trailer Line 1 |
| FOR USING | Trailer Line 2 |
| Visa Cash CARD | Trailer Line 3 |
| | Trailer Line 4 |

FIG. 18

Balance Inquiry (Funds Account) Receipt

```
123456789012345678901234          Ruler (not printed)

┌─────────────────────────┐       Header line 1
│   SMART CARD SOLUTIONS  │       Header line 2
│    810 CARDINAL LANE    │       Header line 3
│    HARTLAND, WI 53029   │       Header line 4
│      414.369.3400       │
│                         │
│ Terminal Numb 1234567890│
│                         │       Time/date
│  12/31/1999    23:59:59 │
│                         │
│        Visa Cash        │       System Name
│      BALANCE INQUIRY    │
│       FROM SAVINGS      │       balance inquiry from savings
│       FROM CHECKING     │       balance inquiry from checking
│      FROM CREDIT CARD   │       balance inquiry from credit card
│                         │
│ CARD NO xxxxxxxxxxxx1234│       Funds card number
│ ACCOUNT BAL  $123456.78 │       Funds account balance
│                         │
│       THANK YOU!        │       Trailer Line 1
│        FOR USING        │       Trailer Line 2
│      Visa Cash CARD     │       Trailer Line 3
└─────────────────────────┘       Trailer Line 4
```

FIG. 19

Request Message

| DESCRIPTION | LENGTH | VALUE | VALUE DESCRIPTION/RANGE |
|---|---|---|---|
| Burroughs Poll/Select Header | | | |
| Start of Header | 1 | SOH (0x01) | |
| Controller Address (AD1) | 1 | variable | 0x20..0x7F |
| Terminal Address (AD2) | 1 | variable | 0x21..0x51 |
| Start of Data | 1 | STX (0x02) | |
| Solicited/Unsolicited ID | 1 | 1 (0x31) | 1 = unsolicited; 2 = solicited |
| Message Identifier | 1 | 1 (0x31) | 1 = Consumer Request |
| Field Separator | 1 | FS (0x1C) | |
| Logical Unit Number (LUNO) | 3 or 9 | variable | |
| Field Separator | 1 | FS (0x1C) | |
| Field Separator | 1 | FS (0x1C) | |
| Field Separator | 1 | FS (0x1C) | |
| Top-of-Form (TOF) Flag | 1 | variable | 1 = printing at top of form; 0 = not |
| Message Coordination Number | 1 | variable | 0x31..0x3F = circular incremented request identifier (see Response) |
| Field Separator | 1 | FS (0x1C) | |
| Track 2 Data | max 40 | variable | including start and end sentinels |
| Field Separator | 1 | FS (0x1C) | |
| Track 3 Data | max 106 | variable | <empty> |
| Field Separator | 1 | FS (0x1C) | |
| **Operation Key Buffer | 0 or 8 | variable | "AA  "=Load from Credit Card<br>"AB  "=Load from Checking<br>"AC  "=Load from Savings<br>"BA  "=Unload to Credit Card<br>"BB  "=Unload to Checking<br>"BC  "=Unload to Savings<br>"CA  "=Balance Inquiry from Credit Card<br>"CB  "=Balance Inquiry from Checking<br>"CC  "=Balance Inquiry from Savings |
| Field Separator | 1 | FS (0x1C) | |
| Dollar/Cents Keyboard Entry | 0 or 8 or | variable | 8 chars zero filled |
| Field Separator | 1 | FS (0x1C) | |
| PIN Buffer | 0 or 16 | variable | ANSI PIN/PAN Block<br>16 characters translated from '0'...'9','A'...'F' to 0x30..0x3F ('0'...'9',':',';','<','=','>','?' |
| Field Separator | 1 | FS (0x1C) | |
| General Purpose Buffer B | max 32 | variable | <empty> |
| Field Separator | 1 | FS (0x1C) | |
| Field Separator | 1 | FS (0x1C) | |
| Buffers to Follow ID | 1 | 9 (0x39) | |
| Buffer ID | 3 | 077 | 077 indicates Smart Card use |
| Buffer Data | 78 | variable | S1 Smart Card signature(see S1 Data) |
| Burroughs Poll/Select Trailer: | | | |
| End of Data | 1 | ETX (0x03) | |
| Block Check Character | 1 | variable | |

\* indicates optional field
\*\* The assigned "keys" above do not correspond to the actual keys pressed for the named functions.

FIG. 21

S1 Data

| DESCRIPTION | LENGTH | VALUE | VALUE DESCRIPTION/RANGE |
|---|---|---|---|
| Random Code | 8 | variable | Hex (ATM Date & Time –MMDDhhmmss) |
| Load Amount | 8 | variable | Hex |
| Currency Code | 4 | variable | Dec |
| SVC PAN | 16 | variable | Dec |
| Expiration Date (YYMMDD) | 6 | variable | Dec |
| Current Balance | 8 | variable | Hex |
| Transaction Counter(Sequence Number) | 4 | variable | Hex |
| Acquirer's BIN | 8 | variable | Dec |
| Load Request Signature 1 | 16 | variable | Raw |

FIG. 22

Response Message

| DESCRIPTION | LENGTH | VALUE | VALUE DESCRIPTION/RANGE |
|---|---|---|---|
| Burroughs Poll/Select Header: | | | |
|   End of Transmission | 1 | EOT (0x04) | |
|   Controller Address (AD1) | 1 | variable | 0x20..0x7F |
|   Terminal Address (AD2) | 1 | variable | 0x21..0x51 |
|   Fast Select | 1 | FSL (0x73) | |
|   Start of Header | 1 | SOH (0x01) | |
|   Controller Address (AD1) | 1 | variable | 0x20..0x7F |
|   Terminal Address (AD2) | 1 | variable | 0x21..0x51 |
|   Start of Data | 1 | STX (0X02) | |
| Function Command Identifier | 1 | 4 (0x34) | |
| Field Separator | 1 | FS (0x1C) | |
| Logical Unit Number (LUNO) | 3 or 9 | ignore | |
| Field Separator | 1 | FS (0x1C) | |
| Message Sequence Number | 3 | ignore | 000-999 |
| Field Separator | 1 | FS (0x1C) | |
| Next State ID | max 3 | variable | 000-249,256-511 |
| Field Separator | 1 | FS (0x1C) | |
| Number of Bills Dispensed | max 15 | ignore | |
| Field Separator | 1 | FS (0x1C) | |
| Transaction Serial Number | 4 | variable | 0000-9999 (stored in Journal) |
| Function Identifier | 1 | ignore | 0-9, A-Z, ? |
| Screen Number | 3 | ignore | 000-999 |
| Screen Display Update Data | variable | ignore | |
| The following group of fields is optional and can be repeated until there is a total of seven function identifiers: | | | |
|   Group Separator | 1 | GS (0x1D) | |
|   Function Identifier | 1 | ignore | 0-9, A-Z, ? |
|   *Screen Number | 3 | ignore | 000-999 |
|   *Screen Display Update Data | variable | ignore | |
| Field Separator | 1 | FS (0x1C) | |
| Message Coordination Number | 1 | variable | 0x31..0x3F = from Request |
| Card Return/Retain Flag | 1 | ignore | 0 = return card; 1 = retain card |
| Printer Flag | 1 | ignore | |
| Printer Data | 12 | variable | Account Balance (zero filled) |
| The following group of fields is optional and can be repeated until a TOTAL of 580 bytes has been reached for all Printer Flag and Printer Data fields: | | | |
|   Field Separator | 1 | FS (0x1C) | |
|   Printer Flag | 1 | ignore | see above |
|   Printer Data | max 580 | ignore | |
| The following group of fields is optional: | | | |
|   Field Separator | 1 | FS (0x1C) | |
|   Track 3 Field ID | 1 | 4 (0x34) | |
|   Track 3 Data | max 106 | ignore | |
| Field Separator | 1 | FS (0x1C) | |
| SVC Field ID | 1 | = (0x3D) | |
| SVC Data | 16 | variable | S2 Smart Card Signature from Host |
| Burroughs Poll/Select Trailer: | | | |
|   End Of Data | 1 | ETX (0x03) | |
|   Block Check Character | 1 | variable | |

* indicates optional field

FIG. 23

Completion Message

| DESCRIPTION | LENGTH | VALUE | VALUE DESCRIPTION/RANGE |
|---|---|---|---|
| Burroughs Poll/Select Header: | | | |
|   Start of Header | 1 | SOH (0x01) | |
|   Controller Address (AD1) | 1 | variable | 0x20..0x7F |
|   Terminal Address (AD2) | 1 | variable | 0x21..0x51 |
|   Start of Data | 1 | STX (0x02) | |
| Solicited/Unsolicited ID | 1 | 2 (0x32) | 1 = unsolicited; 2 = solicited |
| Message Identifier | 1 | 2 (0x32) | 2 = Solicited Status |
| Field Separator | 1 | FS (0x1C) | |
| Logical Unit Number (LUNO) | 3 or 9 | variable | |
| Field Separator | 1 | FS (0x1C) | |
| Field Separator | 1 | FS (0x1C) | |
| Status Descriptor | 2 | variable | 'B' = successful comm (approved or denied) '8' = card failure |
| Field Separator | 1 | FS (0x1C) | |
| *Device Identifier | 1 | ? (0x3F) | ? = dispenser error |
| *Status | variable | "0003" | bytes 0,1,2 are not used byte 3 indicates nothing dispensed |
| **Field Separator | 1 | FS (0x1C) | |
| **Buffers to Follow Identifier | 1 | 9 (0x39) | |
| **Stored Value Card Buffer ID | 3 | 077 | 077 indicates Smart Card use |
| Stored Value Card Data | 16 | variable | S3 Smart Card Signature from Card* |
| Burroughs Poll/Select Trailer: | | | |
|   End of Data | 1 | ETX (0x03) | |
|   Block Check Character | 1 | variable | |

\* indicates optional field included only when transaction was approved by host but failed at the card/terminal
\*\* indicates optional field included only when transaction was approved by host and completed successfully
\*\*\* it is possible to have a successful status descriptor ('B') but no S3 if the status of the card update was unknown. The host will treat this as a suspect transaction. If status is unknown, the transaction is stored in the Journal.

FIG. 24

Poll Message

| DESCRIPTION | LENGTH | VALUE | VALUE DESCRIPTION/RANGE |
|---|---|---|---|
| End Of Transmission | 1 | EOT (0x04) | |
| Controller Address (AD1) | 1 | variable | 0x20..0x7F |
| Terminal Address (AD2) | 1 | variable | 0x21..0x51 |
| Poll | 1 | POL (0x70) | |
| Enquiry | 1 | ENQ (0x05) | |

FIG. 25

Settlement Communications

The following shows an overview of communications for batch upload.

| TERMINAL | | Settlement Host |
|---|---|---|
| End-of-Day processing | | |
| Dial | → | |
| Header Record | → | |
| Transaction Data | → | |
| Transaction Data | → | |
| Trailer Record | → | |
| HANGUP | | HANGUP |

FIG. 26

| |
|---|
| Batch Header Record (Type 01 Terminal 01) LF |
| Data Record 1 LF |
| Data Record 2 LF |
| Data Record 3 LF |
| . |
| . |
| . |
| Data Record n LF |
| Batch Trailer Record (Terminal 01)LF |
| Batch Header Record (Type 02 Terminal 01) LF |
| Data Record 1 LF |
| Data Record 2 LF |
| Data Record 3 LF |
| . |
| . |
| . |
| Data Record n LF |
| Batch Trailer Record (Terminal 01)LF |
| Batch Header Record (Type 03 Terminal 01) LF |
| Data Record 1 LF |
| Data Record 2 LF |
| Data Record 3 LF |
| . |
| . |
| . |
| Data Record n LF |
| Batch Trailer Record (Terminal 01)LF |

FIG. 27

Card Issuance/Refund Batch Header Record Format

| Data Element | Length | Purpose/Format |
|---|---|---|
| Header Record Indicator | 1 byte | Identify beginning of batch and header record<br>Constant Value: "H" |
| File Type | 2 bytes | Identifies type of transactions that batch contains<br>Constant Value: "01" - Card Activations / Refunds batch |
| Record Count | 4 bytes | Identify the number of data records in the file<br>Numeric, Right Justified, Zero Filled |
| Date | 6 bytes | File Transfer Date<br>YYMMDD |
| Time | 6 bytes | File Transfer Time<br>hhmmss |
| Terminal ID Number | 10 bytes | Source terminal identification number<br>Alphanumeric, Left Justified, Space Filled |
| Filler [1] | 20 bytes | Reserved for future use<br>Zero Filled |
| RECORD LENGTH | 29-49 bytes | |

[1] - Optional Field Reserved for future use. Must be Zero Filled when present

FIG. 28

Card Issuance and Refund Transaction Format (Data Records)

| Data Element | Length | Format/Attribute(s) |
|---|---|---|
| Journal Record Number | 4 bytes | Unique incrementing number that orders each transaction within the batch.<br>Range 0001 - 9999<br>Numeric, Right Justified, Zero filled |
| Date | 8 bytes | Transaction Date<br>CCYYMMDD |
| Time | 6 bytes | Transaction Time<br>hhmmss |
| Transaction Number | 6 bytes | Unique transaction sequence number generated by the terminal<br>Range 000001 - 999999<br>Numeric, Right justified, Zero Filled |
| Terminal ID Number | 10 bytes | Terminal Identification Number.<br>Must match Terminal ID # in Header<br>alphanumeric, Right justified, Zero Filled |
| Transaction Type | 1 byte | Transaction Type Identifier<br>Numeric, Values:<br>0 = Card Purchase<br>1 = Reserved For Future<br>2 = Card refund (with deactivation) |
| SVC Issuer BIN Number | 6 bytes | ISO Card BIN Number assigned to the SVC<br>Numeric<br>May alternately be comprised of:<br>Issuer (3 Bytes) + Venue (3 Bytes) |
| SVC Serial Number | 10 bytes | Serial number assigned to the SVC<br>SVC Issuer Bin + SVC Serial Number form the SVC Number. This identifies a unique SVC within the iq SVS cardholder database.<br>Numeric, Right Justified, Zero Filled |
| SVC Expiration Date | 6 bytes | Card expiration date.<br>YYMMDD |
| Card Value or Refund Amount | 6 bytes | Transaction amount in cents.<br>For Card Activations, this is the activation amount. For Card Refunds, this is the refund amount.<br>$$$$¢¢, Numeric, Right justified, Zero Filled, Implied Decimal |
| Payment Type [1] | 1 byte | Method used to purchase the SVC<br>Numeric, Values:<br>0 = Cash<br>1 = Credit Card<br>2 = Debit Card<br>3 = Check<br>4 = Complimentary/Promotion<br>5-9 = Future Use |
| Payment Descriptor [1] | 1 byte | Type of Credit card used to purchase the SVC.<br>Note: Applies to Payment Type 1 only.<br>Numeric, Values:<br>0 = N/A (Payment types 0, 2-9)<br>1 = VISA<br>2 = MC<br>3 = AMEX<br>4 = Discovery<br>5 = Debit |

FIG. 29

|  |  | 6 = Other |
|---|---|---|
| Card Type [1] | 1 byte | The type of SVC<br>Numeric, Values:<br>0 = Disposable<br>1 = Reload |
| Payment PAN [1] | 19 bytes | PAN of the card used to purchase the SVC if applicable. (Payment type = 1 or 2).<br>Numeric, Right Justified, Zero Filled. |
| Payment Expiry [1] | 4 bytes | Expiry date of the card used to purchase the SVC if applicable (Payment type = 1 or 2).<br>YYMM, Numeric, Right Justified, Zero Filled |
| Filler [2] | 10 bytes | Reserved for future use<br>Zero Filled. |
| RECORD LENGTH | 63 - 99 bytes |  |

[1] - Optional fields. If the data is present it will be captured and processed by the iq SVS host. If the data to populate all of these fields is not available the fields may be Zero Filled.

[2] - Optional Field Reserved for future use. Must be Zero Filled when present.

FIG. 30

Card Issuance/Refund Batch Trailer Record Format

| Data Element | Length | Purpose/Format |
|---|---|---|
| Trailer record indicator | 1 byte | Identify end of batch and trailer record<br>Constant Value: "T" |
| Total SVC Sale Amount | 9 bytes | Total SVC card activation amounts within this batch. Used for validation/reconciliation.<br>$$$$$$$¢¢, Numeric, Right Justified, Zero Filled, Implied decimal |
| Total SVC Refund Amount | 9 bytes | Total SVC card refund amounts within this batch. Used for validation/reconciliation.<br>$$$$$$$¢¢, Numeric, Right Justified, Zero Filled, Implied decimal |
| Net File Amount Indicator | 1 byte | The positive or negative sign of Total SVC Sale Amount - Total SVC Refund Amount.<br>Used for validation/reconcilliation<br>Alpha, Values:<br>"+" = Net Positive File Amt.<br>"-" = Net Negative File Amt. |
| Net File Amount | 9 bytes | Total SVC Sale Amount - Total SVC Refund Amount. Used for validation/reconciliation<br>$$$$$$$¢¢, Numeric, Right Justified, Zero Filled, Implied decimal |
| Filler [1] | 20 bytes | Reserved for future use.<br>Zero Filled. |
| RECORD LENGTH | 29-49 bytes | |

[1] - Optional Field Reserved for future use. Must be Zero Filled when present.

FIG. 31

Goods and Services Batch Header Record Format

| Data Element | Length | Purpose/Format |
|---|---|---|
| Header Record Indicator | 1 byte | Identify beginning of batch and header record<br>Constant Value: "H" |
| File Type | 2 bytes | Identifies type of transactions that batch contains<br>Constant Value: "02" - Goods & Services batch |
| Record Count | 4 bytes | Identify the number of data records in the file<br>Numeric, Right Justified, Zero Filled |
| Date | 6 bytes | File Transfer Date<br>YYMMDD |
| Time | 6 bytes | File Transfer time<br>hhmmss |
| Terminal ID Number | 10 bytes | Source terminal identification number<br>Alphanumeric, Left Justified, Space Filled |
| Filler [1] | 20 bytes | Reserved for future use<br>Zero Filled. |
| RECORD LENGTH | 29-49 bytes | |

[1] - Optional Field Reserved for future use. Must be Zero Filled when present.

FIG. 32

Goods and Services Transaction Format (Data Records)

| Data Element | Length | Format/Attributes(s) |
|---|---|---|
| Journal Record Number | 4 bytes | Unique incrementing number that orders each transaction within the batch. Range 0001 - 9999 Numeric, right Justified, Zero filled |
| Date | 8 bytes | Transaction Date CCYYMMDD |
| Time | 6 bytes | Transaction Time hhmmss |
| Transaction Number | 6 bytes | Unique transaction sequence number generated by the terminal Range 000001 - 999999 Numeric, Right justified, Zero filled |
| Terminal ID Number | 10 bytes | Terminal Identification Number. Must match Terminal ID # inHeader alphanumeric, Right justified, Zero Filled |
| Transaction Type | 1 byte | Transaction Type Identifier Constant: "3" - Goods and Services Transaction |
| SVC Issuer BIN Number | 6 bytes | ISO Card BIN Number assigned to the SVC Numeric May alternately be comprised of: Issuer (3 Bytes) + Venue (3 Bytes) |
| SVC Serial Number | 10 bytes | Serial number assigned to the SVC SVC Issuer Bin + SVC Serial Number form the SVC Number. This identifies a unique SVC within the iq SVS cardholder database. Numeric, Right Justified, Zero Filled. |
| SVC Expiration Date | 6 bytes | Card expiration date. YYMMDD |
| Transaction Amount | 6 bytes | Dollar amount specified in cents of the transaction. $$$$¢¢, Numeric, Right Justified, Zero Filled, Implied Decimal |
| SVC Ending Blance | 6 bytes | Balance specified in cents remaining on the card after the transaction. $$$$¢¢, Numeric, Right Justified, Zero Filled, Implied Decimal |
| Filler [1] | 10 bytes | Reserved for future use. Zero Filled. |
| RECORD LENGTH | 69-79 bytes | |

[1] - Optional Field Reserved for future use. Must be Zero Filled when present

FIG. 33

Goods and Services Batch Trailer Record Format

| Data Element | Length | Purpose/Format |
|---|---|---|
| Trailer record indicator | 1 byte | Identify end of batch and trailer record<br>Constant Value: "T" |
| Total SVC Sale Amount | 9 bytes | Total amount of all Goods and Services transactions within this batch.<br>$$$$$$$¢¢, Numeric, Right Justified, Zero Filled, Implied decimal |
| Total SVC Return Amount | 9 bytes | Reserved for future use. Zero Fill<br>$$$$$$$¢¢, Numeric, Right Justified, Zero Filled, Implied decimal |
| Net File Amount Indicator | 1 byte | The positive or negative sign of Total SVC Sale Amount - Total SVC Refund Amount.<br>Used for validation/reconciliation<br>Alpha, Values:<br>"+" = Net Positive File Amt.<br>"-" = Net Negative File Amt. |
| Net File Amount | 9 bytes | Total SVC Sale Amount - Total SVC Return Amount. Used for validation/reconciliation<br>$$$$$$$¢¢, Numeric, Right Justified, Zero Filled, Implied decimal |
| Filler [1] | 20 bytes | Reserved for future use.<br>Zero Filled |
| RECORD LENGTH | 29-49 bytes | |

[1] - Optional Field Reserved for future use. Must be Zero Filled when present

FIG. 34

Card Reload Batch Header Record Format

| Data Element | Length | Purpose/Format |
|---|---|---|
| Header Record Indicator | 1 byte | Identify beginning of batch and trailer record |
| | | Constant Value: "H" |
| File Type | 2 bytes | Identifies type of transactions that batch contains |
| | | Constant Value: "04" - Card Reload batch |
| Record Count | 4 bytes | Identify the number of data records in the file |
| | | Numeric, Right Justified, Zero Filled |
| Date | 6 bytes | File Transfer Date |
| | | YYMMDD |
| Time | 6 bytes | File Transfer Time |
| | | hhmmss |
| Terminal ID Number | 10 bytes | Source terminal identification number |
| | | Alphanumeric, Left Justified, Space Filled |
| Filler [1] | 20 bytes | Reserved for future use |
| | | Zero Filled. |
| RECORD LENGTH | 29-49 bytes | |

[1] - Optional Field Reserved for future use. Must be Zero Filled when present

FIG. 35

Card Reload Transaction Format

| Data Element | Length | Format/Attribute(s) |
|---|---|---|
| Journal Record Number | 4 bytes | Unique incrementing number that orders each transaction within the batch.<br>Range 0001 - 9999<br>Numeric, right Justified, Zero filled |
| Date | 8 bytes | Transaction Date<br>CCYYMMDD |
| Time | 6 bytes | Transaction Time<br>hhmmss |
| Transaction Number | 6 bytes | Unique transaction sequence number generated by the terminal<br>Range 000001 - 999999<br>Numeric, Right justified, Zero Filled |
| Terminal ID Number | 10 bytes | Terminal Identification Number.<br>Must match Terminal ID # in Header<br>Alphanumeric, Right justified, Zero Filled |
| Transaction Type | 1 byte | Transaction Type Identifier<br>Constant: "5" - Card Activation Transaction |
| SVC BIN Number | 6 bytes | ISO Card BIN Number assigned to the SVC<br>Numeric<br>May alternately be comprised of:<br>Issuer (3 Bytes) + Venue (3 Bytes) |
| SVC Serial Number | 10 bytes | Serial number assigned to the SVC<br>SVC Issuer BIN + SVC Serial Number form the SVC Number. This identifies a unique SVC within the iq SVS cardholder database.<br>Numeric, Right Justified, Zero Filled |
| SVC Expiration Date | 6 bytes | Card expiration date.<br>YYMMDD |
| Reload Amount | 6 bytes | Dollar amount, specified in cents, of the reload amount<br>$$$$¢¢, Numeric, Right Justified, Zero Filled, Implied Decimal |
| SVC Ending Balance | 6 bytes | Balance specified in cents, of the card after the reload<br>$$$$¢¢, Numeric, Right Justified, Zero Filled, Implied Decimal |
| Payment Method | 1 byte | Method used to purchase the SVC<br>Numeric, Values:<br>0 = Cash<br>1 = Credit Card<br>2 = Debit Card<br>3 = Check<br>4 = Complimentary/Promotion<br>5-9 = Future Use |
| Payment Descriptor | 1 byte | Type of Credit card used to purchase the SVC.<br>Note: Applies to Payment Type 1 only.<br>Numeric Values:<br>0 = N/A (Payment types 0, 2-9)<br>1 = VISA<br>2 = MC<br>3 = AMEX<br>4 = Discovery<br>5 = Debit<br>6 = Other |
| Payment PAN | 19 bytes | PAN of the card used to purchase the SVC if applicable. (Payment type = 1 or 2).<br>Numeric, Right Justified, Zero Filled. |
| Payment Expiry | 4 bytes | Expiry date of the card used to purchase the SVC if applicable (Payment type = 1 or 2).<br>YYMM, Numeric, right Justified, Zero Filled |
| Filler [1] | 10 bytes | Reserved for future use<br>Zero Filled. |
| RECORD LENGTH | 94-104 bytes | |

[1] - Optional Field Reserved for future use. Must be Zero Filled when present

FIG. 36

Card Reload Batch Trailer Record Format

| Data Element | Length | Purpose/Format |
|---|---|---|
| Trailer record indicator | 1 byte | Identify end of batch and trailer record<br>Constant Value: "T" |
| Total SVC Reload Amount | 9 bytes | Total amount of all Reload transactions within this batch.<br>$$$$$$$¢¢, Numeric, right Justified, Zero Filled, Implied decimal |
| Filler | 9 bytes | Reserved for future use. Zero Fill<br>$$$$$$$¢¢, Numeric, right Justified, Zero Filled, Implied decimal |
| Net File Amount Indicator | 1 byte | The positive or negative sign of Net File Amount<br>Used for validation reconciliation<br>Constant Value: "+" = Net Positive File Amt. |
| Net File Amount | 9 bytes | Total amount of all Reload transactions within this batch.<br>Same as Total SVC Reload Amount<br>$$$$$$$¢¢, Numeric, right Justified, Zero Filled, Implied decimal |
| Filler [1] | 20 bytes | Reserved for future use.<br>Zero Filled |
| RECORD LENGTH | 29-49 bytes | |

[1] - Optional Field Reserved for future use. Must be Zero Filled when present.

FIG. 37

Administrative Access

| Step | Display | Action |
|------|---------|--------|
| 0.0 | Visa Cash<br><br>INSERT CARD | USER: Press Shift Key.<br>TERMINAL: Display Idle Prompt. The terminal will ignore any key press except Shift. Following entry of the Shift key, go to step 0.1.<br>[MAIN] |
| 0.1 | Visa Cash<br><br>INSERT CARD | USER: Pres t key.<br>TERMINAL: Display Idle Prompt in default language. If t key pressed, go to step 0.2. Any other key press, got to step 0.0.<br>[MAIN] |
| 0.2 | Visa Cash<br><br>INSERT CARD | USER: Press s key.<br>TERMINAL: Display Idle Prompt in default language. If s key pressed, go to step 0.3. Any other key press, go to step 0.0.<br>[MAIN] |
| 0.3 | Visa Cash<br><br>INSERT CARD | USER: Enter password followed by ENTER key. Press CANCEL key<br>before ENTER if password is entered incorrectly.<br>TERMINAL: Display Idle Prompt in default language. (Do not display password digits entered.) If CANCEL is pressed, go to step 0.0. If password entered, go to step 0.4.<br>[MAIN] |
| 0.4 | Visa Cash<br><br>INSERT CARD | TERMINAL: If default password entered, go to step 0.5. If correct non-default password entered, go to step 0.8. If invalid password entered, go to step 0.9.<br>[MAIN] |
| 0.5 | Visa Cash<br><br>INSERT CARD | TERMINAL: If default password is no longer valid, beep and return to step 0.0. If default password is still valid, go to step 0.6.<br>[MAIN] |

FIG. 38

| Step | Display | Action |
|---|---|---|
| 0.6 | ENTER<br>NEW PASSWORD<br>OR CANCEL<br><br>\*\*\*\* | USER: Enter new password followed by ENTER key. (CLEAR key can be used to clear key presses before ENTER is pressed.)<br>TERMINAL: Echo key presses with \*. If CLEAR key is pressed, remove last character and echo. If CANCEL key is pressed, go to step 0.0. If password is not exactly 12 digits, go to step 0.0. When ENTER key is pressed, go to step 0.7.<br>[NEW PASSWORD] |
| 0.7 | CONFIRM<br>NEW PASSWORD<br>OR CANCEL<br><br>\*\*\*\* | USER: Re-enter new password followed by ENTER key. (CLEAR key can be used to clear key presses before ENTER is pressed.)<br>TERMINAL: Echo key pressed with \*. If CLEAR key is pressed, remove last character and echo. If CANCEL key is pressed, retain old (default) password and go to step 0.0. If password entered does not match password entered in step 0.6, go to step 0.0. If passwords match, save new password and go to step 0.8.<br>[NEW PASSWORD CONFIRM] |
| 0.8 | ## admin func 1<br>## admin func 2<br>## admin func 3<br>## admin func 4 | USER: Select desired administrative function.<br>TERMINAL: Display administrative functions. (See Administrative Functions section for more info.) Press function keys for the corresponding admin function or press t key to scroll down to next display of functions or press s key to scroll up to previous display of functions or press the corresponding 2-digit number of the desired function. If CANCEL key is pressed, return to step 0.0.<br>[ADMIN MENU] |

FIG. 39

Administrative Functions

The following is a list of administrative functions

| Num | Func Display | Func Description |
|-----|--------------|------------------|
| 00 | Print Funcs | Print Administrative Function List |
| 01 | Batch Upload | Batch Upload (Electronic Journal) |
| 10 | Tran Report | Detail Transaction Report |
| 11 | Load Report | Load Statistics Report |
| 12 | Totals Report | Terminal Totals Report |
| 13 | Clr Term Data | Clear Transactions, Totals and Statistics |
| 20 | Term Config | Terminal Configuration |
| 21 | Prompt Config | Prompt Configuration |
| 22 | Error Config | Error Configuration |
| 23 | VCC OnUs Cfg | Card On Us Configuration (Setup or Maintenance) |
| 24 | Fund OnUs Cfg | Funds On Us Configuration (Setup or maintenance) |
| 30 | Prnt Term Cfg | Print |
| 31 | Prn Prmpt Cfg | Print Prompt Configuration |
| 32 | Print Err Cfg | Print Error configuration |
| 33 | Print VCC Cfg | Print Card On Us Configuration |
| 34 | Prnt Fund Cfg | Print Funds On Us Configuration |
| 40 | Writ Cfg->Crd | Write Configuration To Card |
| 41 | Read Cfg<-Crd | Read Configuration From Card |
| 42 | Prnt Card Cfg | Print Configuration From Card |
| 43 | Mssg Cfg->Crd | Write Message Configuration To Card |
| 44 | MSSG Cfg<-Crd | Read Message Configuration From Card |
| 45 | Prnt Mssg Cfg | Print Message Configuration |
| 50 | Load New Key | Load New Session Key From Host |
| 70 | Date and Time | Set Date And Time |
| 80 | Service Term | Service Terminal |
| 99 | New Password | New Administrative Password |

FIG. 40

Batch Upload (Settlement)

This function immediately initiates settlement, regardless of automatic settlement configuration.

| Step | Display | Action |
|---|---|---|
| 1.0 | BATCH UPLOAD<br><br>Please Wait<br>Communicating... | TERMINAL: Display while communicating. If settlement completes successfully, got to step 2.0. If settlement fails, go to step 3.0. |
| 2.0 | BATCH UPLOAD<br>Settlement<br>Successful<br>Press any key | TERMINAL: Reset/Clear Batch data. Wait for key press, then go to step 0.8 in Section 3.1 above. |
| 3.0 | BATCH UPLOAD<br>Settlement<br>Failed<br>Press any key | TERMINAL: Wait for key press, then go to step 0.8 in Section 3.1 above. |

FIG. 41

Set Date And Time
This function allows the internal real-time clock to be set.

| Step | Display | Action |
|---|---|---|
| 1.0 | CURRENT TIME<br>MM/DD/YYYY HH:MM<br>ENTER NEW TIME | USER: Enter new date and time followed by ENTER key. (CLEAR key can be used to clear key presses before ENTER is pressed.)<br>TERMINAL: If CANCEL key is pressed, go to step 0.8.<br>    When ENTER key is pressed, set internal clock and go to step 0.8. |

FIG. 42

Detail Transaction Report

This function prints a report of all the stored Load transactions.

| Step | Display | Action |
|---|---|---|
| 1.0 | TRAN REPORT<br><br>Please Wait<br>Printing... | TERMINAL: Display while printing. When complete go to step 0.8. |

FIG. 43

Detail Transaction Report

```
123456789012345678901234
```
```
  SMART CARD SOLUTIONS
     810 CARDINAL LANE
    HARTLAND, WI  53029
        414.369.3400
     Terminal 1234567890

12/31/1999       23:59:59

TRANSACTION DETAIL

TRAN DATE ENBAL LD/UNLD
 VCC NUM         BANK CARD
 mmdd hhmm  ddd.cc Lddd.cc
 123456790123456     *1234
 mmdd hhmm  ddd.cc Uddd.cc
 1234567890123456    *1234

** END OF REPORT **
```

Ruler (not printed)

Header line 1

Header line 2

Header line 3

Header line 4

Time/date

FIG. 44

Load Statistics Report

This function prints a report of statistics for Load attempts.

| Step | Display | Action |
|---|---|---|
| 1.0 | LOAD REPORT<br><br>Please Wait<br>Printing... | TERMINAL: Display while printing. When complete go to step 0.8. |

FIG. 45

Load Statistics Report

```
123456789012345678901234
  SMART CARD SOLUTIONS
     810 CARDINAL LANE
     HARTLAND, WI 53029
        414.369.3400
    Terminal  1234567890

12/31/1999        23:59:59

LOAD STATISTICS
          BY DAY

SUCC FAIL FAIL FAIL
  DAY  TOTL TOTL HOST CARD
  MMDD 1234 1234 1234 1234
  MMDD 1234 1234 1234 1234
  ...
  MMDD 1234 1234 1234 1234
  TOT  12345 1234 1234 1234

BY MONTH

SUCC FAIL FAIL FAIL
  MON  TOTL TOTL HOST CARD
  MM   1234 1234 1234 1234
  MM   1234 1234 1234 1234
  ...
  MM   1234 1234 1234 1234
  TOT  12345 1234 1234 1234

** END OF REPORT **
```

Ruler (not printed)

Header line 1
Header line 2
Header line 3
Header line 4

Time/date today
yesterday 29 days ago (30 days total)

this month
last month eleven months age (12 months total)

FIG. 46

Terminal Totals Report

This function prints a report of Transaction Totals.

| Step | Display | Action |
|---|---|---|
| 1.0 | TOTALS REPORT<br><br>Please Wait<br>Printing... | TERMINAL: Display while printing. When complete go to step 0.8 |

FIG. 47

Terminal Totals Report

```
  123456789012345678901234
```
| | |
|---|---|
| SMART CARD SOLUTIONS | Ruler (not printed) |
| 810 CARDINAL LANE | |
| HARTLAND, WI 53029 | Header line 1 |
| 414.369.3400 | Header line 2 |
| Terminal 1234567890 | Header line 3 |
| | Header line 4 |
| 12/31/1999     23:59:59 | |
| | Time/date |
| TERMINAL TOTALS | |
| BY DAY | |

| DAY | CARD | LD/UNLD | TOT | |
|---|---|---|---|---|
| MMDD | MC | | 123456.78 | today |
| | VISA | | 123456.78 | today |
| MMDD | TOTAL | | 1234567.89 | today |
| MMDD | MC | | 123456.78 | yesterday |
| | VISA | | 123456.78 | yesterday |
| MMDD | TOTAL | | 1234567.89 | yesterday |
| MMDD | MC | | 123456.78 | 29 days ago (30 days total) |
| | VISA | | 123456.78 | 29 days ago (30 days total) |
| MMDD | TOTAL | | 1234567.89 | 29 days ago (30 days total) |
| GRAND | TOTAL | | 12345678.90 | |

BY MONTH

| DAY | CARD | LD/UNLD | TOT | |
|---|---|---|---|---|
| MM | MC | | 123456.78 | this month |
| | VISA | | 123456.78 | this month |
| MM | TOTAL | | 1234567.89 | this month |
| MM | MC | | 123456.78 | last month |
| | VISA | | 123456.78 | last month |
| MM | TOTAL | | 1234567.89 | last month |
| MM | MC | | 123456.78 | eleven months ago (12 months total) |
| | VISA | | 123456.78 | eleven months ago (12 months total) |
| MM | TOTAL | | 1234567.89 | eleven months ago (12 months total) |
| GRAND | TOTAL | | 12345678.90 | |

END OF REPORT

FIG. 48

Clear Transactions, Totals and Statistics

This function clears all stored transactions and load statistics.

| Step | Display | Action |
|------|---------|--------|
| 1.0 | CLR TERM DATA<br>Transactions ><br>Load Stats ><br>Term Totals > | USER: Select corresponding key for desired function.<br>TERMINAL: Wait for key press. If CANCEL key is pressed, return to step 0.8 in Section 3.1 above. If F6 is pressed, go to step 2.0. If F7 is pressed, go to step 3.0. If F8 is pressed, go to step 4.0. |
| 2.0 | CLEAR TRANSACTION DATA?<br><br><YES       NO> | USER: Select corresponding key for desired function.<br>TERMINAL: Wait for key press. If F4 is pressed, go to step 5.0. If F8 or CANCEL key is pressed, go to step 1.0. |
| 3.0 | CLEAR LOAD STATISTICS?<br><br><YES       NO> | USER: Select corresponding key for desired function.<br>TERMINAL: Wait for key press. If F4 is pressed, go to step 5.0. If F8 or CANCEL key is pressed, go to step 1.0. |
| 4.0 | CLEAR TERMINAL TOTALS?<br><br><YES       NO> | USER: Select corresponding key for desired function.<br>TERMINAL: Wait for key press. If F4 is pressed, go to step 5.0. If F8 or CANCEL key is pressed, go to step 1.0. |
| 5.0 | CLR TERM DATA<br><br>Please Wait<br>Clearing.... | TERMINAL: Delete requested data and display while deleting. When complete go to step 1.0. |

FIG. 49

Terminal Configuration

This function allows access to the Terminal Configuration Data.

| Step | Display | Action |
|---|---|---|
| 1.0 | TERMINAL CONFIG<br>ENTER LOCATION<br>NUMBER | USER: Enter terminal configuration location number.<br>TERMINAL: When ENTER key is pressed, retrieve corresponding prompt and go to step 2.0. If CANCEL is pressed, go to step 0.8. |
| 2.0 | TERMINAL ID<br>0000000001<br>LOC NUM 0<br><br>Change?> | USER: Press F8 to modify configuration data.<br>TERMINAL: When F8 key is pressed, go to step 3.0. If CANCEL is pressed, go to step 1.0. If t key is pressed, retrieve corresponding prompt for next prompt number and go to step 2.0. If s key is pressed, retrieve corresponding prompt for previous prompt number and go to step 2.0. |
| 3.0 | TERMINAL ID<br>000000001<br>ENTER NEW TEXT<br>123456790 | USER: Enter prompt location number.<br>TERMINAL: When ENTER key is pressed, updating corresponding prompt and go to step 2.0. If CANCEL is pressed, go to step 1.0. |

FIG. 50

Print Terminal Configuration

This function will print a report of the Terminal Configuration as stored in terminal memory.

| Step | Display | Action |
|---|---|---|
| 1.0 | PRNT TERM CFG<br><br>Please Wait<br>Printing.... | TERMINAL: Display while printing. When complete go to step 0.8. |

FIG. 51

Print Terminal Configuration

```
         123456789012345678901234
        SMART CARD SOLUTIONS
           810 CARDINAL LANE
          HARTLAND, WI  53029
              414.369.3400
          Terminal 1234567890

12/31/1999      23:59:59

CONFIGURATION
              FROM TERMINAL
                FROM CARD

Terminal ID        0000000000
        LUNO                      000
        .
        .
        .
        HEADER LINES 1-4
        receipt header 1 text
        receipt header 2 text
        receipt header 3 text
        receipt header 4 text TRAILER LINES 1-4
        receipt trailer 1 text
        receipt trailer 2 text
        receipt trailer 3 text
        receipt trailer 4 text NOTE: Terminal Config
        items are numbered
        from 0 through end

** END OF REPORT **
```

Ruler (not printed)

Header line 1
Header line 2
Header line 3
Header line 4

Time/date from terminal
from Smart card

FIG. 52

Prompt Configuration

This function allows access to the Prompt Configuration Data.

| Step | Display | Action |
|---|---|---|
| 1.0 | PROMPT CONFIG<br>ENTER PROMPT<br>LOCATION NUMBER | USER: Enter prompt location number.<br>TERMINAL: When ENTER key is pressed, retrieve corresponding prompt and go to step 2.0. If CANCEL is pressed, go to step 0.8 |
| 2.0 | PROMPT 123<br>*Prompt Text 123*<br><br><br>Change?> | USER: Press F8 to modify prompt text.<br>TERMINAL: When F8 key is pressed, go to step 3.0. If CANCEL is pressed, go to step 1.0. If t key is pressed, retrieve corresponding prompt for next prompt number and go to step 2.0. If s key is pressed, retrieve corresponding prompt for previous prompt number and go to step 2.0. |
| 3.0 | PROMPT 123<br>*Prompt Text 123*<br>ENTER NEW TEXT | USER: Enter prompt location number.<br>TERMINAL: When ENTER key is pressed, updating corresponding prompt and go to step 2.0. If CANCEL is pressed, go to step 0.8. |

FIG. 53

Print Prompt Configuration

This function will print a report of the Prompt Configuration as stored in terminal memory. See the Reports and Receipts section for more detail.

| Step | Display | Action |
|---|---|---|
| 1.0 | PRNT PRMPT CFG<br><br>Please Wait<br>Printing.... | TERMINAL: Display while printing. When complete go to step 0.8. |

FIG. 54

Print Terminal Configuration

```
         123456789012345678901234
        ┌────────────────────────┐
        │   SMART CARD SOLUTIONS │
        │    810 CARDINAL LANE   │
        │    HARTLAND, WI 53029  │
        │       414.369.3400     │
        │    Terminal 1234567890 │
        │                        │
        │  12/31/1999   23:59:59 │
        │                        │
        │   PROMPT CONFIGURATION │
        │                        │
        │ NUMBR  PROMPT TEXT     │
        │ 000                    │
        │ 001    prompt 1 text   │
        │ 002    prompt 2 text   │
        │  .                     │
        │  .                     │
        │  .                     │
        │ xxx    last prompt text│
        │                        │
        │    ** END OF REPORT ** │
        └────────────────────────┘
```

Ruler (not printed)

Header line 1
Header line 2
Header line 3
Header line 4

Time/date prompt 0 is a blank line

FIG. 55

Error Configuration

This function allows access to the Error Configuration Data.

| Step | Display | Action |
|---|---|---|
| 1.0 | ERROR CONFIG<br><br>ENTER STATE NUM | USER: Enter state number from host.<br>TERMINAL: When ENTER key is pressed, retrieve prompt information for that state. If prompt number is not in the configured list and the list is not full, go to step 1.1. If the prompt number is not in the configured list and the list is full, go to step 1.2. If prompt number entered is 999, go to step 3.0. If prompt number entered is 998, go to step 4.0. If prompt number entered is 997, go to step 5.0. Otherwise, go to step 2.0. If CANCEL is pressed, go to step 0.8. |
| 1.1 | STATE NUM 123<br>NOT FOUND<br>Add? | USER: Press F8 to add a new state.<br>TERMINAL: If F8 pressed, add the state with prompt number 0 for each and go to step 2.0. If CANCEL is pressed, go to step 1.0. |
| 1.2 | STATE NUM 123<br>NOT FOUND<br>CANNOT ADD<br>STATE LIST FULL | TERMINAL: Wait for configured Display Delay. Go to step 1.0. |
| 2.0 | 123         Change?><br>*Prompt Text 123*<br>678         Change?><br>*Prompt Text 678* | USER: Press function key to change prompt.<br>TERMINAL: Display the 2 prompts associated with the state ID. If F5 is pressed, go to step 2.1. If F7 is pressed, go to step 2.2. If CANCEL is pressed, go to step 1.0. |
| 2.1 | 123 New Prmpt<br>*Prompt Text 123*<br>678<br>*Prompt Text 678* | USER: Enter new prompt location number.<br>TERMINAL: When ENTER key is pressed, update the prompt information for that state and return to step 2.0. If CANCEL is pressed, go to step 1.0 without updating the prompt information. |
| 2.2 | 123<br>*Prompt Text 123*<br>678 New Prmpt<br>*Prompt Text 678* | USER: Enter new prompt location number.<br>TERMINAL: When ENTER key is pressed, update the prompt information for that state and return to step 2.0. If CANCEL is pressed, go to step 1.0 without updating the prompt information. |
| 3.0 | DEFAULT STATE<br>123<br>Change?> | USER: Press F8 key to change prompt.<br>TERMINAL: If F8 pressed, go to step 3.1. If CANCEL is pressed, go to step 1.0. |
| 3.1 | DEFAULT STATE<br>123<br>ENTER NEW TEXT<br>012 | USER: Enter new state number.<br>TERMINAL: When ENTER is pressed, go to step 3.0. If CANCEL is pressed, go to step 1.0. |

FIG. 56

| 4.0 | REENTR PIN STATE<br>123<br>Change?> | USER: Press F8 key to change prompt.<br>TERMINAL: If F8 pressed, go to step 4.1. If CANCEL is pressed, go to step 1.0. |
|---|---|---|
| 4.1 | REENTR PIN STATE<br>123<br>ENTER NEW TEXT<br>012 | USER: Enter new state number.<br>TERMINAL: When ENTER is pressed, go to step 4.0. If CANCEL is pressed, go to step 1.0. |
| 5.0 | NSF STATE<br>123<br>Change?> | USER: Press F8 key to change prompt.<br>TERMINAL: If F8 pressed, go to step 5.1. If CANCEL is pressed, go to step 1.0. |
| 5.1 | DEFAULT STATE<br>123<br>ENTER NEW TEXT<br>012 | USER: Enter new state number.<br>TERMINAL: When ENTER is pressed, go to step 5.0. If CANCEL is pressed, go to step 1.0. |

FIG. 57

Print Error Configuration
This function prints the Error Configuration Report.

| Step | Display | Action |
|---|---|---|
| 1.0 | PRINT ERR CFG<br><br>Please Wait<br>Printing.... | TERMINAL: Display while printing. When complete go to step 0.8. |

FIG. 58

Print Error Configuration

```
         123456789012345678901234
        ┌────────────────────────┐
        │   SMART CARD SOLUTIONS │
        │     810 CARDINAL LANE  │
        │     HARTLAND, WI 53029 │
        │        414.369.3400    │
        │     Terminal 1234567890│
        │                        │
        │   12/31/1999   23:59:59│
        │                        │
        │    ERROR CONFIGURATION │
        │                        │
        │ NEXT STATE ID          │
        │  |    PROMPT LOC NUMBERS│
        │  |     |   PROMPT TEXT │
        │ -------------------    │
        │  123  123  1234567890123456│
        │       123  1234567890123456│
        │  123  123  1234567890123456│
        │       123  1234567890123456│
        │                        │
        │     ** END OF REPORT **│
        └────────────────────────┘
```

Ruler (not printed)

Header line 1
Header line 2
Header line 3
Header line 4

Time/date two prompts associated with each state two prompts associated with each state

FIG. 59

VCC On Us Configuration

This function allows access to the Visa Cash Card On Us Configuration Data (BIN Table).

| Step | Display | Action |
|------|---------|--------|
| 1.0 | VISA CASH ON US 111111 TO 123456 <Next Delete?> Change?> | USER: Press F3 to see next range. Press F7 to delete this range from table. Press F8 to modify this range.<br>TERMINAL: Display configured range (starting with the first in table). If F3 is pressed, get the next range and redisplay. If F7 is pressed, delete this range, get the next range and redisplay. If F8 is pressed, go to step 2.0. If CANCEL is pressed, go to step 0.8. |
| 2.0 | BIN LOW  111111 Change?> BIN HIGH  123456 Change?> | USER: Press F6 to change low range value. Press F8 to change high range value.<br>TERMINAL: If F6 is pressed, go to step 2.1. If F8 is pressed, go to step 2.2. If CANCEL is pressed, go to step 1.0. |
| 2.1 | BIN LOW _____1 Change?> BIN HIGH  123456 Change?> | USER: Enter new low range value.<br>TERMINAL: When ENTER is pressed, update low range value and go to step 2.0. If CANCEL is pressed, go to step 2.0 without updating low range value. |
| 2.2 | BIN LOW  111111 Change?> BIN HIGH _____1 Change?> | USER: Enter new high range value.<br>TERMINAL: When ENTER is pressed, update high range value and go to step 2.0. If CANCEL is pressed, go to step 2.0 without updating high range value. |

FIG. 60

Print VCC On Us Configuration

This function will print a report of the VCC On Us Configuration as stored in terminal memory.

| Step | Display | Action |
|---|---|---|
| 1.0 | PRNT VCC CFG<br><br>Please Wait<br>Printing... | TERMINAL: Display while printing. When complete go to step 0.8 in Section 3.1 above. |

FIG. 61

Print VCC On Us Configuration

```
         123456789012345678901234
        ┌────────────────────────┐
        │   SMART CARD SOLUTIONS │
        │     810 CARDINAL LANE  │
        │    HARTLAND, WI 53029  │
        │       414.369.3400     │
        │    Terminal 1234567890 │
        │                        │
        │  12/31/1999    23:59:59│
        │                        │
        │     VCC ON US CONFIG   │
        │                        │
        │  BIN LO NUM to BIN HI NUM │
        │  ---------------------- │
        │     111111 to 123456   │
        │     222222 to 234567   │
        │     333333 to 345678   │
        │     444444 to 456789   │
        │                        │
        │    ** END OF REPORT ** │
        └────────────────────────┘
```

Ruler (not printed)

Header line 1
Header line 2
Header line 3
Header line 4

Time/date

FIG. 62

Funds On Us Configuration

This function allows access to the Visa Cash Card On Us configuration Data (FIT Table).

| Step | Display | Action |
|---|---|---|
| 1.0 | FUNDS ON US<br>111111 to 123456<br><Next   Delete?><br><br>Change?> | USER: Press F3 to see next range. Press F7 to delete this range from table. Press F8 to modify this range.<br>TERMINAL: Display configured range (starting with the first in table). If F3 is pressed, get the next range and redisplay. If F7 is pressed, delete this range, get the next range and redisplay. If F8 is pressed, go to step 2.0. If CANCEL is pressed, go to step 0.8. |
| 2.0 | FIT LOW  111111<br>Change?><br>FIT HIGH  123456<br>Change?> | USER: Press F6 to change low range value. Press F8 to change high range value.<br>TERMINAL: If f6 is pressed, go to step 2.1. If F8 is pressed, go to step 2.2. If CANCEL is pressed, go to step 1.0. |
| 2.1 | FIT LOW _____ 1<br>Change?><br>FIT HIGH  123456<br>Change?> | USER: Enter new low range value.<br>TERMINAL: When ENTER is pressed, update low range value and go to step 2.0. If CANCEL is pressed, go to step 2.0 without updating low range value. |
| 2.2 | FIT LOW  111111<br>Change?><br>FIT HIGH _____ 1<br>Change?> | USER: Enter new high range value.<br>TERMINAL: When ENTER is pressed, update high range value and go to step 2.0. If CANCEL is pressed, go to step 2.0 without updating high range value. |

FIG. 63

Print Funds On Us Configuration

This function will print a report of the Funds On Us Configuration as stored in terminal memory.

| Step | Display | Action |
|---|---|---|
| 1.0 | PRN FUNDS CFG<br><br>Please Wait<br>Printing... | TERMINAL: Display while printing. When complete go to step 0.8 |

FIG. 64

Print Funds On Us Configuration

```
123456789012345678901234
  SMART CARD SOLUTIONS
     810 CARDINAL LANE
     HARTLAND, WI 53029
        414.369.3400
     Terminal 1234567890

12/31/1999      23:59:59

FUNDS ON US CONFIG

FIT LO NUM to FIT HI NUM
  ------------------------
      111111 to 123456
      222222 to 234567
      333333 to 345678
      444444 to 456789

** END OF REPORT **
```

Ruler (not printed)

Header line 1
Header line 2
Header line 3
Header line 4

Time/date

FIG. 65

Read Terminal Configuration From Card

This function reads the Terminal Configuration as stored on a smart card.

| Step | Display | Action |
|---|---|---|
| 1.0 | READ CFG<-CRD<br>INSERT CONFIGURATION CARD | USER: Insert configuration card.<br>TERMINAL: Wait for card insertion. If card is not inserted after waiting for customer timeout, issue audible warning. After waiting for another customer timeout, return to step 0.8 in Section 3.1 above. If card is detected, attempt to read configuration data. If valid card with configuration data, go to step 2.0. See SMART CARD Configuration Data Section for more detail. If invalid card or data, go to step 1.1. If CANCEL key is pressed, return to step 0.8 |
| 1.1 | INVALID CONFIGURATION CARD<br>PLEASE TAKE CARD | USER: Take configuration card.<br>TERMINAL: Eject card and prompt until card is removed. When card is removed, go to step 0.8. |
| 2.0 | READ CFG<-CRD<br><br>Please Wait<br>Reading... | TERMINAL: Read data and update configuration data and display while Reading. When complete go to step 3.0. |
| 3.0 | PLEASE TAKE CARD | USER: Take configuration card.<br>TERMINAL: Eject card and prompt until card is removed. When card is removed, go to step 0.8. |

FIG. 66

Print Terminal Configuration From Card

This function will print a report of the Terminal Configuration as stored on a smart card.
Redeipts section for more detail.

| Step | Display | Action |
|---|---|---|
| 1.0 | PRNT CARD CFG INSERT CONFIGURATION CARD | USER: Insert configuration card.<br>TERMINAL: Wait for card insertion. If card is not inserted after waiting for customer timeout, issue audible warning. After waiting for another customer timeout, return to step 0.8 in Section 3.1 above. If card is detected, attempt to read configuration data. If valid card with configuration data, go to step 2.0. See Configuration Data Report for more detail. If invalid card or data, go to step 1.1. If CANCEL key pressed, return to step 0.8 |
| 1.1 | INVALID CONFIGURATION CARD PLEASE TAKE CARD | USER: Take configuration card.<br>TERMINAL: Eject card and prompt until card is removed. When card is removed, go to step 0.8. |
| 2.0 | PRNT CARD CFG<br><br>Please Wait Printing... | TERMINAL: Display while printing. When complete go to step 3.0. |
| 3.0 | PLEASE TAKE CARD | USER: Take configuration card.<br>TERMINAL: Eject card and prompt until card is removed. when card is removed, go to step 0.8 |

FIG. 67

Smart Card Configuration Data

Configuration data that will be stored on a smart card.

| DESCRIPTION | DATA TYPE | DEFAULT VALUE |
|---|---|---|
| Terminal ID | 10N | 0000000001 |
| LUNO | 9N | 000 |
| Transaction Host Telephone Number | 16N | <empty> |
| Transaction Host 2 Telephone Number | 16N | <empty> |
| Settlement Host Telephone Number | 16N | <empty> |
| Settlement Host 2 Telephone Number | 16N | <empty> |
| Poll/Select Controller ID | 2H (0x20..0x7F) | 00 |
| Poll/Select Terminal ID | 2H (0x20..0x51) | 00 |
| Settlement Auto | 1N (0=No, 1=Yes, 2=Emergency Only) | No |
| Auto Settlement Time | HHMM | <empty> |
| Auto Settlement Day | 1N (1=Sunday...7=Saturday, 0=Daily) | <empty> |
| Auto Settlement End Date | MMDDYYYY | <empty> |
| Auto Working Key Time | HHMM | 0 |
| Auto Working Key Internal (Days) | 3N (0 to 255: 0=Never) | 0 |
| Auto Working Key Window | MMM (0 to 255 [minutes]: 0=Never) | 0 |
| Receipt Header 1 | 24AN | <empty> |
| Receipt Header 2 | 24AN | <empty> |
| Receipt Header 3 | 24AN | <empty> |
| Receipt Header 4 | 24AN | <empty> |
| System Name | 12AN | Visa Cash |
| Receipt Trailer 1 | 24AN | <empty> |
| Receipt Trailer 2 | 24AN | <empty> |
| Receipt Trailer 3 | 24AN | <empty> |
| Receipt Trailer 4 | 24AN | <empty> |

FIG. 68

Write Terminal Configuration To Card

This function writes the Terminal Configuration to a smart card.

| Step | Display | Action |
|---|---|---|
| 1.0 | WRITE CFG-<CRD<br>INSERT CONFIGURATION CARD | USER: Insert configuration card.<br>TERMINAL: Wait for card insertion. If card is not inserted after waiting for customer timeout, issue audible warning. After waiting for another customer timeout, return to step 0.8 in Section 3.1 above. If card is detected, determine if the card is valid. If valid card, go to step 2.0. See SMART CARD Configuration Data Section for more detail. If invalid card or data, go to step 1.1. If CANCEL key is pressed, return to step 0.8 |
| 1.1 | INVALID CONFIGURATION CARD<br>PLEASE TAKE CARD | USER: Take configuration card.<br>TERMINAL: Eject card and prompt until card is removed. When card is removed, go to step 0.8. |
| 2.0 | WRITE CFG-<CRD<br><br>Please Wait<br>Writing... | TERMINAL: Write configuration data to card and display while writing. If configuration written to card successfully, got to step 3.0. If not, go to step 2.1. |
| 2.1 | ERROR CONFIGURATION DATA NOT WRITTEN<br><br>PLEASE TAKE CARD | |
| 3.0 | CONFIGURATION DATA WRITTEN<br><br>PLEASE TAKE CARD | USER: Take configuration card.<br>TERMINAL: Eject card and prompt until card is removed. When card is removed, go to step 0.8 |

FIG. 69

ELECTRONIC PURSE CARD VALUE SYSTEM CARD SECURITY METHOD

This application claims the benefit of U.S. Provisional Application No. 60,044,423 filing date Apr. 29, 1997.

TECHNICAL FIELD

This invention relates to systems for carrying out financial transactions electronically. Specifically, this invention relates to a system which loads and unloads data representative of cash value to and from an integrated circuit bearing card, which card may be used by a card bearer to obtain goods, services or other items of value. The system of the present invention enables the card bearer to debit the cash value loaded on to the card from a bank account associated with the card or to debit or charge the value to other accounts associated with different cards.

BACKGROUND ART

Transaction processing systems have been developed which enable consumers to obtain. goods or services by using credit or debit cards. Credit cards are used by a consumer to charge against an account for the goods or services being provided. When using a credit card, the consumer later pays the credit card issuer for the amount charged. A common example of a credit card is the VISA® card provided by VISA International.

Debit cards may also be used by consumers to pay for goods or services. A debit card is associated with a bank account maintained by the consumer. When a consumer uses a debit card to pay for goods or services, the amount of the transaction is deducted from the consumer's account.

Electronic credit and debit card terminals have been developed which facilitate the processing of debit and credit card transactions. Merchants generally have these terminals at a point of sale of goods or services. Such terminals are connected through telephone or other data lines to computer networks which process and keep accounts of transactions. When a consumer purchases goods or services at a point of sale the consumer's account may be charged if a credit card is used and the merchant's account may be credited. Similarly, if a debit card is used to pay for the purchase, the consumers account is debited for the amount of the purchase and the merchant's account is credited.

Such point of sale (POS) terminals often keep a record of the transactions in memory. Periodically the terminal is connected via data line to a computer called a settlement host which receives a record of all the transactions that have been conducted. The settlement host operates to make sure that the merchant's account is properly credited for all of the transactions that have been carried out at the terminal.

The vast majority of credit and debit cards in use in the United States today contain information on the customer account associated with the card. This information is presented in two forms. The account number associated with the customer's account is presented in raised numerals on the card along with the customer's name and certain other information. This enables a merchant to mechanically make an impression of the account data on a multi-part form. The other way in which account information is generally provided is by encoding the account information on a magnetic stripe on the back of the card. The magnetic stripe may have up to three data bearing tracks which includes data representative of the customer's account number, name and other data.

Conventionally, the account number data on a customer's card includes a numeric identifier which identifies the card issuer and/or the bank which issued the card. This account number data, which is generally referred to as a primary account number or "PAN" contains sufficient information to identify the card issuer and the account. Often, particularly in the case of debit cards, the account number includes a bank institution number or "BIN" which identifies a particular bank. Electronic financial processing networks have been developed which enable the routing of the transaction messages based on the card information so that the appropriate accounts are charged and credited.

In recent years, integrated circuit cards have been developed. These cards are often referred to as "smart cards". Integrated circuit cards are similar to conventional debit and credit cards, except that they additionally include an integrated circuit chip. The integrated circuit chip is used to store data related to the customer and his or her account. The integrated circuit chip often includes encryption programs and stored data which are used to correlate card information with a personal identification number or PIN which a customer may input in a transaction terminal. This correlation is used to provide authentication that the bearer is the proper user of the card.

Integrated circuit type chip cards also generally include data in memory representative of cash value. This cash value data is stored on the card. This value may be used in the same manner as cash by the card bearer to purchase goods or services.

Terminals have been developed which read the data included on the integrated circuit and which change the stored data to represent an addition or subtraction of cash value. Merchants who have such terminals may accept a customer's integrated circuit card as payment by reducing the value data stored on the card.

Systems involving the use of integrated circuit cards have not been used extensively in the United States due to a lack of available systems for processing such transactions. Before integrated circuit cards may gain wide acceptance there must be a means of loading the data representative of value on to the integrated circuit card. Ideally such loading must be done conveniently from a consumer's other accounts. In addition, wide acceptance of such cards requires the development of systems for settlement between entities which charge a consumer for the value loaded on the card and the merchants who reduce the value data on the integrated circuit card in payment for goods or services.

Thus, there exists a need for a system which is capable of loading and unloading data representative of value on to an integrated circuit card in which the value is taken from and returned to sources of funds associated with credit or debit cards. There further exists a need for a system which provides settlement between entities involved in transfers of cash value to and from the card users, which value is represented by data stored on the integrated circuit cards.

DISCLOSURE OF INVENTION

It is an object of the present invention to provide an electronic purse card value system.

It is a further object of the present invention to provide an electronic purse card value system for use in connection with integrated circuit cards.

It is a further object of the present invention to provide an electronic purse card value system which includes a terminal device for loading and unloading data representative of value from an integrated circuit card.

It is a further object of the present invention to provide an electronic purse card value system which includes novel electronic transaction message formats.

It is a further object of the present invention to provide an electronic purse card value system that includes novel electronic message settlement formats.

It is a further object of the present invention to provide methods for operating an electronic purse card value system.

Further objects of the present invention will be made apparent in the following Best Modes for carrying out invention and the appended claims.

The foregoing objects are accomplished in a preferred embodiment of the present invention by an electronic purse card value system which includes at least one terminal device. The terminal device accepts an integrated circuit card which includes an integrated circuit thereon which is enabled to store data representative of value. Hereinafter integrated circuit cards are alternatively referred to as "smart cards", "stored value cards" or "SVCs". A stored value card accepted by the terminal device also preferably has thereon a magnetic stripe which carries indicia such as magnetically encoded credit card or debit card data.

The terminal device preferably includes a modem to enable selective communication between the terminal device and a plurality of host computers. The terminal device is programmed to connect to a particular host computer responsive to data included on a customer's card to process card transactions. The terminal is further configured to connect to a settlement host computer to transmit records of the transactions carried out at the terminal for settlement purposes.

The preferred embodiment of the terminal of the present invention enables a customer to load and unload value to and from a stored value card, respectively. The customer is enabled to load value from selected charge accounts or bank accounts. These accounts include a particular account associated with the card to which value is to be loaded, as well as accounts associated with other credit or debit cards. Similarly, the customer is enabled to unload value from the stored value card and to have the unloaded value credited to an account associated with the stored value card, or a different account card.

The preferred embodiment of the terminal device of the present invention also enables a consumer to make balance inquiries concerning the amount of cash value stored in memory on a stored value card. The customer is also enabled to make account balance inquiries related to various other accounts. This may be a bank account or charge account associated with the stored value card or accounts associated with other cards. The terminal device of the present invention is also capable of carrying out administrative functions as well as settlement functions in the system.

BRIEF DESCRIPTION OF DRAWINGS

FIG. 3 is a table of the data elements among the configurable data for the terminal device of the electronic purse card value system.

FIG. 4 is a table including descriptions of the data elements shown in FIG. 3.

FIGS. 5 through 15 are a schematic representation of the transaction flow and associated screen displays for the operation of the terminal device.

FIG. 16 is an example of a receipt for a load transaction carried out using the terminal device.

FIG. 17 is a sample unload receipt for an unload transaction carried out using the terminal device.

FIG. 18 is a sample receipt for a balance inquiry on a stored value card carried out using the terminal device.

FIG. 19 is a sample receipt for a balance inquiry concerning an account associated with a card carried out using the terminal device.

FIGS. 21 and 22 are a table showing the format and content of a request message transmitted between the terminal device and the ATM host in the system of the present invention.

FIG. 23 is a table showing the format and content of a response message.

FIG. 24 is a table showing the format and content of a completion message.

FIG. 25 is a table showing the format and content of a poll message.

FIG. 26 is a schematic view of the message flows between the terminal device and a settlement host in the electronic purse card value system of the present invention.

FIG. 27 is a table showing the layout of a settlement message transmitted from the terminal device to the settlement host.

FIG. 28 is a table showing the format and content layout of a batch header included in a settlement message.

FIGS. 29 and 30 are a table showing the format and content layout of card issuance and refund transaction records transmitted between the terminal device and the settlement host.

FIG. 31 is a table showing the format and content layout of a card issuance/refund batch trailer record included in the settlement message.

FIG. 32 is a table showing the format and content layout of a goods and services batch header record included in the settlement message.

FIG. 33 is a table showing the format and content layout of a goods and services transaction record included in the settlement message.

FIG. 34 is a table showing the format and content layout of a goods and services batch trailer record included in the settlement message.

FIG. 35 is a table showing the format and content layout of a card reload batch header record included in the settlement message.

FIG. 36 is a table showing the format and content layout of a card reload transaction record included in the settlement message.

FIG. 37 is a table showing the format and content layout of a card reload batch trailer record included in the settlement message.

FIGS. 38, 39, 41, 42, 43, 45, 47, 49, 50, 51, 53, 54, 56, 57, 58, 60, 61, 63, 64, 66, 67 and 69 are a schematic representation of transaction flow and associated screen displays associated with administrative functions carried out by the terminal device of the electronic purse card value system of the present invention.

FIG. 40 is a table of the administrative functions that are carried out with the terminal device.

FIGS. 44, 46, 48, 52, 55, 59, 62 and 65 are sample reports printed by the terminal device in connection with administrative functions carried out through the terminal device.

FIG. 68 is a table schematically showing configuration data which may be stored on a smart card for configuring the terminal device.

BEST MODES FOR CARRYING OUT INVENTION

Figure 1:
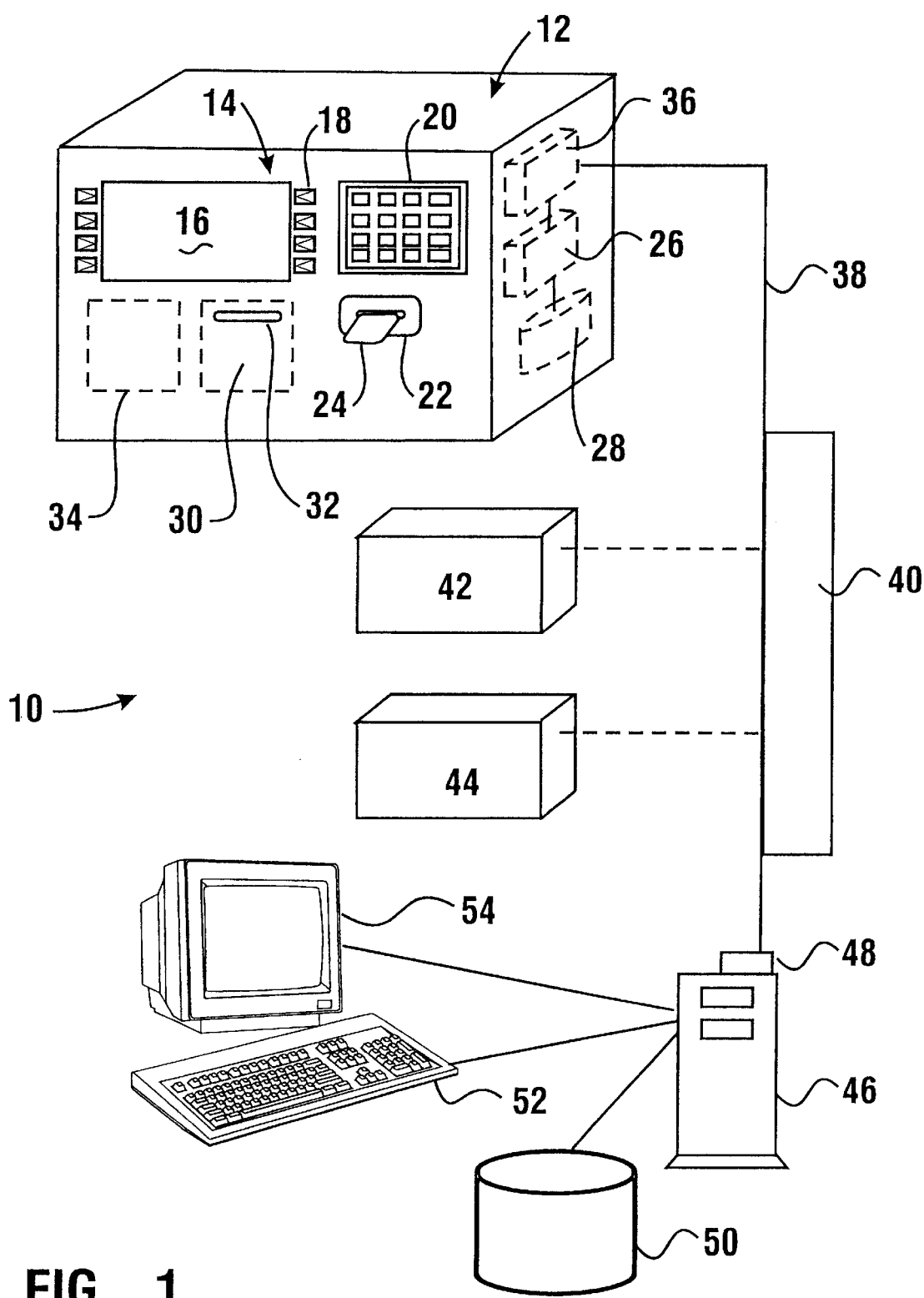
FIG. 1 is a schematic view of the electronic purse card value system of the present invention.

Referring now to the drawings and particularly to FIG. 1, there is shown therein an electronic purse card value system of a preferred embodiment of the present invention generally indicated 10. The system includes a plurality of terminal devices one of which is represented by terminal device 12. In the preferred form of the invention, terminal device 12 is an iq EPIC™ device produced by Diebold, Incorporated, the assignee of the present invention.

Terminal device 12 includes a customer interface schematically indicated 14. Customer interface 14 includes a screen 16 which in the preferred form of the invention is a LCD type display. Adjacent to screen 16 are eight manually actuatable function buttons 18, which are indicated F1 through F8, respectively. The function buttons are positioned adjacent to the screen to enable a user to respond to prompts and to make selections in response to date presented on the screen. Customer interface 14 also includes a keypad 20.

Terminal device 12 also includes a card reader schematically indicated 22. In the preferred form of the invention card reader 22 is a card reader capable of reading both smart cards and magnetic stripe cards, and is a type produced by Mag Tek Incorporated. Card reader 22 accepts credit and debit cards which include magnetic stripe cards, smart cards and cards which have both magnetic stripes and integrated circuits, the cards are passed to the reader through an opening on the front fascia of the terminal device. One such card is shown in FIG. 1 extending through the opening and is schematically indicated 24.

Terminal device 12 further includes a processor schematically indicated 26. Processor 26 is in operative connection with a configurable memory schematically indicated 28. Memory 28 is operative to hold the configuration data related to the operation of the terminal device listed in FIGS. 3 and 4. Memory 28 also holds programs and data necessary for operation of the terminal device. Memory 28 is further operative to retain transaction data which is used for purposes of settlement as later explained.

Terminal device 12 further includes a receipt printer schematically indicated 30. Receipt printer 30 is operative to deliver transaction receipts to consumers who use the terminal device. Printer 30 is also used to print reports which are provided to an operator of the terminal in accordance with the administrative functions which are later explained. Receipt printer 30 is operative to deliver its receipts and reports through a receipt opening 32 in the fascia of the terminal. In the preferred form of the invention receipt printer 30 is a thermal printer provided by Axiohm Corporation which provides 24 columns of printing. Of course, in other embodiments of the invention, other printers may be used.

Terminal device 12 further includes a journal printer schematically indicated 34. Journal printer 34 is of a conventional type and provides a hard copy paper record stored within the terminal of transactions that are carried out at the terminal device. The components of the customer interface 14, the card reader 22, receipt printer 30 and journal printer 34 are all in operative connection with the processor 26 of the terminal device.

Terminal device 22 includes a modem schematically indicated 36. Modem 36 is in operative connection with the processor 26 and terminal software drivers that operate therein. Modem 36 is preferably a dial up type modem that is in connection with a phone line schematically indicated 38. Phone line 38 is connected to a public telephone system schematically indicated 40.

Phone system 40 is connected to host computers schematically indicated 42, 44 and 46. It should be understood that while only three host computers are shown, any number of host computers may be connected in the system. Each of the host computers is accessible at a different address within the system and is accessed at a different telephone number. As shown in more detail with reference to host computer 46, each host computer is in operative connection with a modem 48 which enables exchange of messages with the terminal device 12. In addition, host computer 46 is in operative connection with a data store 50 which is operative to hold program and transaction information. It should be understood that data store 50 in the preferred embodiment comprises database software, for example, relational database software provided by Oracle Corporation. Such database software may reside on the computer 46 or on another computer operatively connected thereto. Each host computer is also preferably in operative connection with an input device 52 as schematically represented by a keyboard, and an output device 54 as schematically represented by a monitor. Of course, in other embodiments other types of input and output devices may be used.

It should be understood that each host computer 42, 44 and 46 may comprise a single computer or a plurality of connected computers which are operatively connected in a network. It should also be understood that while in the preferred embodiment the host computers are connected to the terminal devices through a public phone system, in other embodiments other types of communications systems may be used. These may include for example dedicated data lines, radio systems and combinations thereof.

In the preferred embodiment of the invention the cards used in connection with terminal device 12 include credit or debit cards which have magnetic stripe data. This magnetic stripe data is encoded conventionally and includes the customer's name as well as the customer's primary account number (PAN). The primary account number in the case of bank cards includes a bank identification number (BIN) as part of the customer's account number.

The processor 26 in terminal device 12 also operates to verify a customer's personal identification number (PIN) when a customer inputs a debit type card into the terminal device. The verification of the customer's PIN is accomplished through an algorithm based on the customer's primary account number and other data read from the card. The algorithm and approach used to verify the customer's PIN is done in accordance with the programming of the terminal device and is based on data stored in a financial institution table (FIT). The terminal device accomplishes PIN/card verification based on the bank identification data (BIN) included in the customer's PAN and the programmed approach for accomplishing PIN/card verification for that BIN stored in connection with the FIT table.

Terminal device 12 is also operative to accept cards which include integrated circuits thereon. In the preferred embodiment of the invention, the cards have a EEPROM carried on the card. The EEPROM used in connection with the preferred embodiment is a Siemens SLE4404 which provides a 416 bit memory with an internal PIN check function.

In the preferred embodiment the user memory on the PROM, which is a 206 bit area, is used to represent amounts each bit having a fixed value. Generally, these bits are used to represent larger value amounts, such as dollars, and to accommodate cents data bits in another designated area in the memory are used. A 16 bit scratch pad memory on the PROM may advantageously be used for this purpose.

In the preferred embodiment a redundancy check is also provided in which a further value is stored on the card which is a function of the value stored in each of the memory areas. If the value stored for redundancy check does not correspond with the values stored in the memories the next time the card is attempted to be used, it is apparent that an error or fraudulent activity has occurred. The terminal device 12 is programmed so it will not process further transactions with the card. Of course, in other embodiments other approaches and smart card schemes for storing value and other information may be used.

In the preferred embodiment of the system a customer is enabled to load and unload data representative of value to the integrated circuit chip on the smart card. In a preferred embodiment of the system, the smart cards used in connection with terminal device 12 include not only an integrated circuit chip on the card, but also a magnetic stripe. The magnetic stripe has the data which is indicative of the customer's credit card account. One form of such cards is the VISA™ Cash Card (VCC) which is available from VISA International.

A customer wishing to load data representative of cash value to the integrated circuit chip on their card, is enabled to do so by charging the cash value to the credit card account associated with the card. Alternatively, the customer is enabled to load value to their smart card from a separate account. This is accomplished by the customer using the separate debit or credit card associated with that account.

Similarly, a system may be used by the customer to unload value stored on the integrated circuit chip of their smart card. This value may be unloaded and credited to the customer's account corresponding to the data on the magnetic stripe of the customer's smart card. Alternatively, the value may be unloaded from the smart card into a different account associated with another credit or debit card. The system 10 is also operative to enable a customer to perform balance inquiries. These balance inquiries enable a customer to check the amount of value held on their smart card. This system may also be used to determine the money available in "funds accounts" from which value may be transferred to the smart card. In the case of a VISA™ Cash Card, one of these funds accounts includes the credit card account associated with the smart card and which account corresponds the data for which is encoded on the magnetic stripe.

The memory 28 of terminal device 12 is programmed with computer software which is executed by processor 26. The transaction flow which is enabled to be carried out by the software is schematically represented in the steps shown in FIGS. 5 through 15. The displays which the processor 26 causes to be displayed on screen 16 in response to these program steps are also shown. As previously discussed, the memory 28 of the terminal device 12 also includes data representative of the configuration data shown in FIGS. 3 and 4. This data enables the terminal device to carry out the transaction flow processes.

The typical transactions conducted using the system 10 are now discussed. These transactions typically include: loading value on to a customer's smart card from a funds account of the customer; unloading value from a smart card to the customer's funds account; making a balance inquiry concerning a funds account; and conducting an inquiry concerning the amount of value remaining on the integrated circuit chip of the smart card.

As shown beginning with reference to FIG. 5, a typical transaction flow using the system will begin with a customer approaching the terminal device 12. The terminal device will present the display shown at step 0.0a in FIG. 5. At power up the terminal will check for certain conditions at steps 0.0b through 0.9. If everything is functioning normally in the system, terminal device 12 is operated under the control of processor 26 to present the display shown at step 0.10 in FIG. 7 on screen 16 when a customer approaches.

A customer initiating a load transaction begins by inserting their card into the card reader 22 at step 0.11. At step 1.0 the terminal checks to determine if the card has a valid integrated circuit chip as well as a valid magnetic stripe. As indicated at step 1.0, if the card has a valid integrated circuit chip with valid data, or a magnetic stripe with valid account data, the processor 26 operates the terminal device to display the screen shown at step 1.1. For purposes of this example it will be assumed that the card presented by the customer has both a valid chip and a valid account number on the magnetic stripe.

At step 1.1 a prompt message is presented on the screen 16 prompting the customer to input their PIN through keypad 20. Once the customer inputs their proper PIN and pushes the "enter" key on the keypad, the processor executes step 1.5 in FIG. 8 and checks the status of receipt printer 30. If the processor 26 senses that the printer 30 is working satisfactorily, the processor next executes step 1.7 to check and determine if a valid chip was sensed on the card. In this example such a chip is present and the processor will move to step 2.0 shown in FIG. 9.

Figure 2:
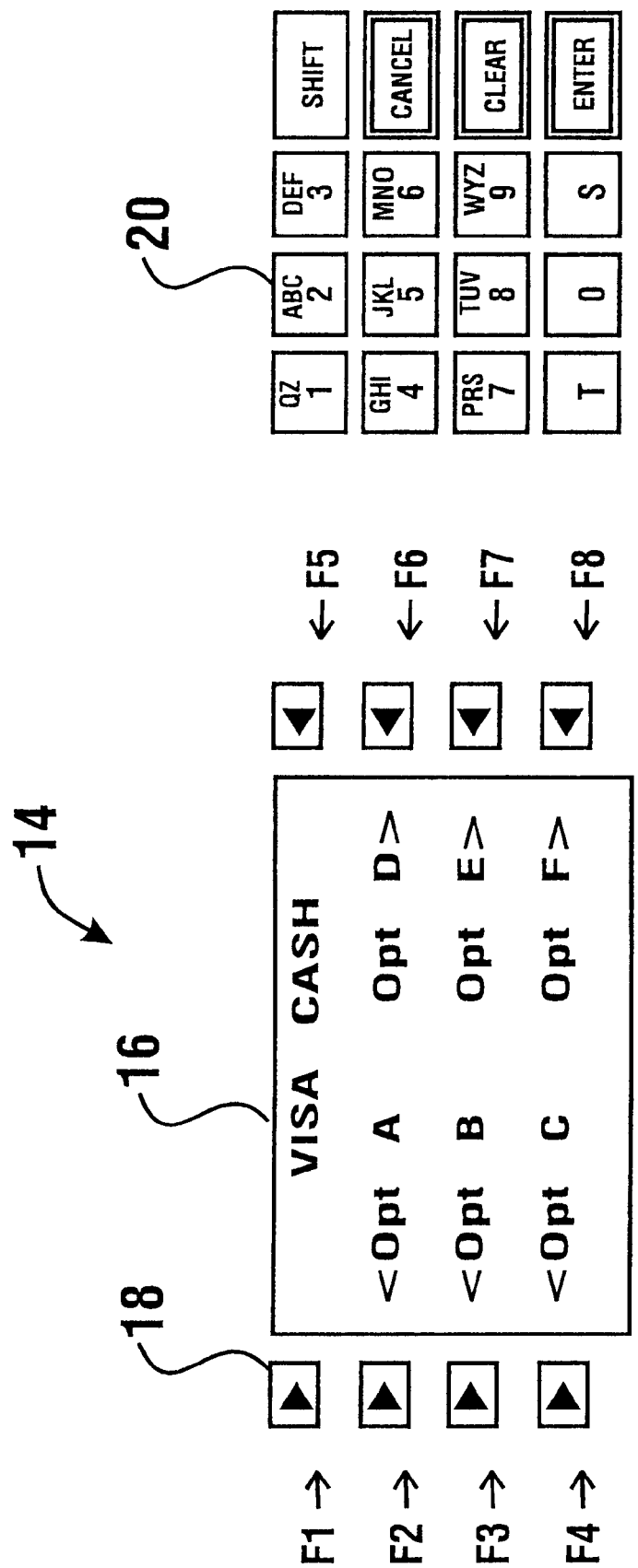
FIG. 2 is a schematic view of the customer interface of the terminal device of the electronic purse card value system.

At step 2.0 the processor is operative responsive to the configuration data stored in its memory 28 to present the display shown on screen 16. This display prompts a customer to select the type of transaction desired. In the case of a load transaction in which value is to be loaded on to the integrated circuit chip of the smart card, the customer presses the function button 18 indicated as button F7 in FIG. 2. In response to the customer making this selection the processor proceeds to step 4.0a shown in FIG. 12.

At step 4.0a a user is prompted by a display on screen 16 to indicate where cash value is to be loaded from. The options include the customer's checking account, savings account or credit card. In response to the customer selecting an account, the processor will next move to step 4.1 in this example because the card includes a valid integrated circuit chip of the VISA™ cash type. At step 4.1 a display is presented on screen 16 which questions the customer concerning whether the value that is to be loaded is to be loaded to the card that is presently in the terminal device or to a different card. This is because the customer has the option of loading cash to the integrated circuit chip directly from the account corresponding to the data on the magnetic stripe of the VISA™ Cash Card. Alternatively, the customer may load value from the account corresponding to the data on the magnetic stripe of the smart card to a different magnetic stripe card.

For purposes of this example and to demonstrate the versatility of this system, it will be assumed that in response to the prompt presented at step 4.1 in FIG. 12, the customer chooses to load value to a different smart card. The customer presses the button 18 corresponding to F7. In response to this selection the processor moves to execute step 4.2 at which the display on screen 16 prompts the customer to take the first card which is delivered out of the card reader 22 and insert the new smart card to which value is to be loaded. At step 4.2, in response to the insertion of a new card, the device checks for a valid chip. Assuming that value can be loaded to the card, the processor then moves on to execute step 4.5.

At step 4.5 the processor is operative to display on screen 16 the prompt message shown. This prompt indicates the current value on the smart card to which additional value is to be loaded. It also indicates the maximum amount that the customer is permitted to load to the card. The screen presents the customer with the option of loading the maximum amount or entering a numerical amount. For purposes of this example it will be assumed that the customer enters a numerical amount using the keypad, in which case the processor moves to step 4.6. If the amount is valid, the processor then moves to step 7.0 shown in FIG. 13.

At step 7.0 the processor is operative to cause the modem 36 to dial the phone number for the host computer associated with the customer's account which is to be charged or debited for the value loaded on to the smart card. The information on the number to dial is derived based on the identifying data concerning the customer's bank or credit card issuer in the magnetic stripe data of the card to be charged. The terminal device 12 resolves the phone number based on the data stored in its memory and contacts the appropriate transaction host that can authorize the transaction, or which has a network connection to another host that can authorize the transaction. For purposes of this example it will be assumed that host 46 is the transaction host.

It should be noted that at step 7.0 terminal device 12 is configured to compensate for failed attempts to reach the appropriate transaction host. As indicated at step 7.0 in FIG. 13, three attempts are made by the terminal to successfully contact the transaction host before an error is indicated. Of course in other embodiments other approaches may be used.

In response to successfully connecting to the transaction host, the terminal 12 transmits a request message to the host. This request message has the format and content layout shown in the table in FIGS. 21 and 22. It should be noted that this request message includes various items of information including customer account data, input PIN data, as well as the type of transaction requested. In addition, the smart card signature data shown in FIG. 22 related to the integrated circuit on the card is also transmitted. It should be understood that the transaction message is preferably sent in encrypted form through the telephone network to the transaction host. Encryption is done in accordance with keys which are stored in the memory 28 of terminal 12 and which may be changed on a periodic basis. The proper method of encryption for a transaction message destined for a particular authorization host is determined by the terminal 12 based on the FIT table data stored in its memory.

In response to receiving a proper request message the transaction host, in this case host 46, sends a response message to the terminal device 12. The response message is operative to indicate to the terminal 12 whether or not the transaction is permitted. The format and content layout of the response message is shown in FIG. 23. The response message includes a next "state" or step which indicates to the processor in terminal device 12 whether or not to go forward with the transaction.

Upon receiving the response message from the transaction host, the processor 26 in the terminal device 12 executes step 7.1 to check the state in the response message. Assuming that the state indicates that the transaction is to go forward, the processor next goes to step 8.0 shown in FIG. 14. At step 8.0 the processor checks to determine the nature of the transaction. For purposes of this transaction example a load transaction to a smart card is being conducted. As a result, the processor 26 sends signals to the card reader 22 which are operative to change the data stored on the integrated circuit chip of the smart card to increase the cash value data therein.

At step 8.0 the terminal device 12 is operative to send a transaction completion message to the authorization host. This indicates to the transaction host that the transaction contemplated was successfully completed and that the value was transferred to the customer's card. The completion message has the format and content layout shown in FIG. 24.

After the value on the card has been updated, the processor next moves to step 8.2. In this step the transaction data is stored in the memory 28. After the data is stored in the memory the processor moves to step 9.0.

At step 9.0 the processor operates the receipt printer to print a receipt for the customer. At the same time a comparable record is printed on paper by the journal printer 34. In the preferred embodiment the journal printer is operative to make a record of the transaction even if a paper receipt is not provided to the customer. It should be noted at step 9.0 that the terminal may be configured so as to prompt the customer as to whether they wish to have a receipt or not. Assuming for purposes of this transaction that the customer is always provided with a receipt, the processor then proceeds to step 9.2 in which the receipt is printed. The journal printer also operates to print the same information simultaneously. In alternative embodiments the journal printer may not be included in the terminal device. In such embodiments all records are stored electronically in memory.

An example of the format for a receipt provided to the customer in response to a load transaction is schematically shown in FIG. 16. The terminal is configured to print the information appropriate for the transaction which has been carried out. For example, if the smart card was loaded from a debit card account, that is indicated by printing the line "cash withdrawal to card". The alternative line that would be printed when the smart card is loaded using a credit card is not printed in this example. Similarly, if the smart card was loaded from funds in a checking account, that line would be printed and the alternative line indicating that the smart card was loaded from a savings account would not be printed.

After printing the receipt the processor next executes step 9.3. In this example the card in the terminal 12 which has been loaded with additional value on its integrated circuit chip, is also a magnetic stripe card. The stripe contains information concerning an account which may be charged. The processor moves to step 9.4 in which the customer is prompted as to whether they want another transaction. Assuming that the customer does not wish to conduct another transaction, a button 18 corresponding to F8 is pressed. The processor next executes step 9.8 to eject the card from the card reader and the processor displays the "thank you" message shown at step 10.0. This completes the load transaction.

Figure 20:
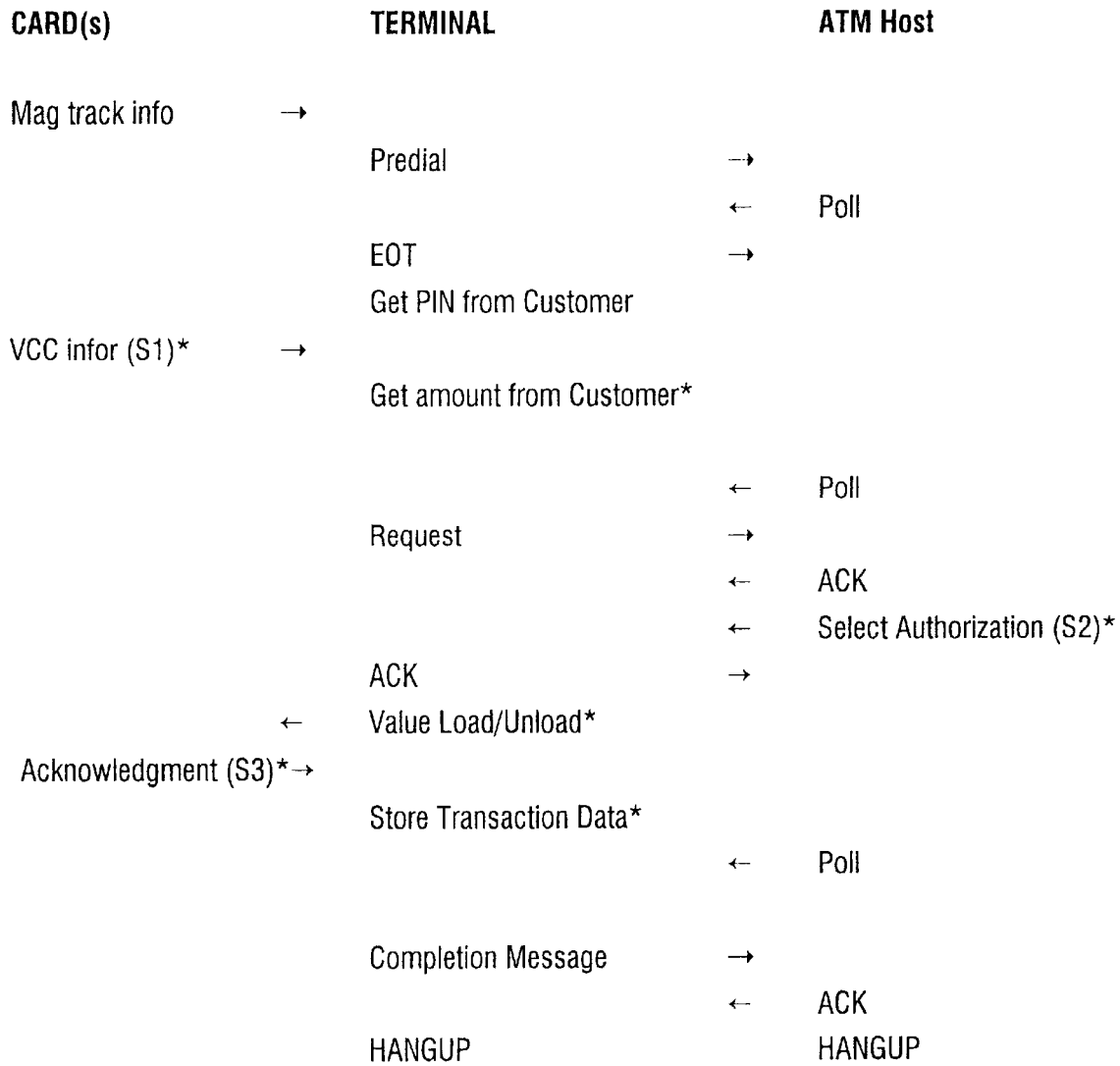
FIG. 20 is a schematic view of the message flows for messages passed between the terminal device and an ATM host in the electronic purse card value system of the invention.

The flow of messages between the terminal device 12 and the transaction host is schematically shown in FIG. 20. The arrows therein represent the messages that are passed back and forth. It should be noted that while the primary messages exchanged between the terminal device and the transaction host include the request, acknowledgment and completion messages, the transaction host is also operative to exchange polling messages and acknowledgment messages with the terminal. In the preferred embodiment these polling and acknowledgment messages are carried out in accordance with the Burroughs Poll Select protocol and the format and content layout of polling messages are schematically represented in FIG. 25.

An unload transaction where value is transferred from the integrated circuit chip on the card to an account is now described. The transaction proceeds through the steps shown in FIGS. 5 through 8 in the manner previously discussed in the description of the load transaction. Upon the processor reaching step 2.0 in FIG. 9, a customer presses the F8 function button to unload the card. In response to pressing the button corresponding to an unload transaction, the processor proceeds to step 3.0 in FIG. 10.

At step 3.0 a determination is made whether the card is one which the system is able to process. This is done based on whether the card data for the particular institution corresponds to an institution in the financial institution table (FIT) in memory 28 of the terminal device. This determines whether the terminal can process the transaction.

Assuming that the card is from an institution which corresponds to an entry in the FIT and can be processed, the processor next moves to step 3.4. At step 3.4 the display prompts the customer to indicate the account into which they wish to unload the funds from the card. The options include a customer's checking account, savings account or credit card. In response to the user inputting a selection, the processor 26 is operative to determine if the card in the machine is a VCC card which indicates that the card is associated with an institution for which transactions can be processed in the system. This is based on the bank identification number stored on the card and the BIN table stored in memory 28. For purposes of this example it will be assumed that there is a valid integrated circuit chip on the card that can be processed in the system. The processor then determines if the cash value represented on the card is greater than the minimum value. Assuming that there is sufficient value above the minimum established in the terminal as capable of being unloaded, the processor next moves to execute step 3.5.

At step 3.5 the processor operates the terminal device to display on the screen 16 a prompt which asks the customer whether they wish to unload value from the card that is in the terminal device, or from a different smart card. For purposes of this example it will be assumed that the customer wishes to unload value from the card in the terminal device, which the customer indicates by pressing the F8 button. In response the processor proceeds to step 3.9. At step 3.9 the processor is operative to display a prompt which questions the customer concerning the amount to be unloaded from the card. The customer has the option of unloading all of the value or a numeric amount. For purposes of this example it will be assumed that the customer enters a numeric amount through the keypad, in which case the processor proceeds to step 3.10.

At step 3.10 the processor operates the terminal to display a prompt which includes the amount entered by the customer through the keypad as the amount to be unloaded from the card. Assuming that the amount entered by the customer is an amount permitted by the system, the processor next proceeds to step 7.0.

At step 7.0 the processor is operative to control the modem to dial the appropriate transaction host. Upon connecting to the appropriate host through the telephone system 40 the terminal device sends a request message. The request message has the content and format layout described in FIGS. 21 and 22. Assuming that the request message is proper the transaction host returns a response message to the terminal device. The response message is received at step 7.1.

The response message sent by the transaction host has the format and content layout shown in FIG. 23. The response message also includes a "next state" indicator which indicates to the processor 26 of the terminal device the next action to take. Assuming that the response message is consistent with an authorized transaction, the processor next moves to step 8.0.

At step 8.0 the processor is operative to update the card. In the cage of an unload transaction, the data on the card is changed to reduce the value on the integrated circuit chip. The amount that the data representative of value is reduced corresponds to the amount transferred to the selected account of the customer. If the terminal device successfully updates the card, the terminal device operates to send a completion message to the transaction host having the format and content layout shown in FIG. 24. The processor proceeds to step 8.2.

At step 8.2 the processor 26 is operative to save the transaction information in the memory 28. Transaction data is stored along with totals and statistics calculated by the processor. In the preferred embodiment each transaction is associated with a sequential number. The processor is also operative to increment the transaction number so that the next transaction will be associated with the next number in the sequence. After updating the data stored in the memory 28, the processor proceeds to step 9.0.

At step 9.0 the processor is operative to check the configuration data stored in memory to determine if a receipt is to be printed. For purposes of this example it will be assumed that a receipt is to be printed and the processor proceeds to step 9.2. At step 9.2 the processor controls the receipt printer 30 to print a receipt. At the same time the receipt is printed the journal printer 34 prints similar information which is stored in hard copy form in the terminal.

The types of information printed on a receipt for an unload transaction is shown in FIG. 17. FIG. 17 shows the various lines of information that may be printed on an unload receipt. Of course, only those lines corresponding to the particular transaction that has been accomplished are printed.

After printing the receipt for the unload transaction, the processor next moves to step 9.3 in which a determination is made as to whether the card in the terminal device is a funds card. In this example it is, in which case the processor proceeds to step 9.4. In step 9.4 the customer is prompted to indicate to the terminal device whether he or she wishes to conduct another transaction. For purposes of this example it is assumed that the customer selects not to conduct another transaction which is done by pressing the F8 function button. In response to the F8 function button being pressed the processor proceeds to step 9.8 in which case the customer's card is delivered out of the terminal device from the card reader 22. The processor then operates the terminal to display the "thank you" screen shown at step 10.0.

It should be noted that the flow of messages from the terminal device to the transaction host during the unload transaction is similar to that in the load transaction is schematically represented in FIG. 20. A similar transaction flow is employed when a customer uses the terminal device to inquire as to the balance in their checking, savings or credit card account which account can be used to load or unload funds. A funds account balance inquiry transaction is now explained with reference to the transaction flow in FIGS. 5 through 15.

The steps associated with a customer's balance inquiry for a funds account will be the same initially as those that previously described up through step 2.0 in FIG. 9. At this step, when the customer wishes to check the balance in a funds account, the customer presses function button F5. In response to this selection the processor moves to step 5.0. At step 5.0 the processor operates the terminal device to present a prompt on the screen which asks the customer to select the account to which the balance inquiry is directed. In response to the customer selecting an account, the processor moves to step 7.0. At step 7.0 the terminal device operates to have the modem 36 dial the appropriate transaction host for the account of the customer. Upon communicating with the transaction host the terminal device sends the request message having the format and content layout shown in FIGS. 21 and 22.

In response to receiving the request message the transaction host returns a response message having the format and content layout shown in FIG. 23. The processor 26 is operative to check the state information in the response message, and assuming that the response message includes a state value that indicates that the inquiry transaction should go forward, the processor next moves to step 8.0 in FIG. 14.

At step 8.0 the processor is operative to check if the transaction request was for an account balance inquiry. If so, the processor moves to step 9.0 and at step 9.0 the processor determines if the terminal is configured to print a receipt for the customer. For purposes of this example it is assumed that the terminal is configured to provide the customer with a receipt automatically and the processor next moves to step 9.2.

At step 9.2 a receipt is printed for the customer showing the balance in the account which was selected. A layout of a form printed by the terminal device and provided to the customer is shown in FIG. 19. Of course, as with the other sample forms only those lines pertaining to the particular transaction are printed. While the transaction receipt is being printed for the customer, the journal printer 34 prints an internal record of the balance inquiry.

After completing the printing, the processor is operative to determine if the customer's card in the card reader is a funds card. If so, the processor moves to step 9.4 in which the terminal device is operative to prompt the customer through the screen 16 as to whether the customer wishes to conduct another transaction. Assuming that the customer does not wish to conduct another transaction the processor next moves to eject the card at step 9.8 and to present the courtesy "thank you" screen at step 10.0.

A further type of exemplary transaction that can be conducted through the system is a card balance inquiry in which a customer requests to know how much value is represented on the integrated circuit chip on their smart card. As will now be appreciated, this type of transaction does not require the terminal device 12 to contact a transaction host because this information can be determined directly from the card.

The process flow through a transaction in which a customer conducts a card balance inquiry proceeds in the manner of the previously described transactions through step 2.0 in FIG. 9. At step 2.0 if the customer wishes to know the card balance, he or she presses the F6 function button. In response to the customer's input the processor is operative to read the value on the card and proceeds to step 2.7.

At step 2.7 the processor determines if the printer 30 is operating. For purposes of this example it is assumed that the printer is working and the processor moves to step 2.8.

At step 2.8 the current balance represented by the data on the smart card is displayed to the customer. The customer is also prompted to indicate whether they wish to print a transaction log or whether they wish to return to step 2.0, the main menu or exit. For purposes of this example it will be assumed that the customer presses the F6 function button to print a transaction log, and the processor moves to step 6.0.

At step 6.0 the processor 26 is operative to read the integrated circuit on the card to determine if there is a log of purchase data recorded therein. In the preferred embodiment of the invention data related to purchase transactions carried out by the customer using the card are stored on the card. This data may include, for example, amounts of purchases and the names of merchants from whom the purchases were made. In alternative embodiments this stored information may also include additional information concerning goods or services that have been purchased. The transaction log preferably also includes information about unsuccessful purchase attempts that the customer may have made using their card, and data concerning this is also recorded. Records of load transactions and unload transactions and the particular accounts from which and to which money was transferred, preferably are also recorded on the card.

At step 6.0 the processor 26 is operative to determine if there is a log of data recorded on the integrated circuit chip of the card. If so, the processor moves to step 9.2. At step 9.2 the printer 30 is operative to print the transaction log from the card for the customer. The journal printer 34 is also operative to make a record of what is printed. Of course, in other embodiments because this transaction does not involve a transaction of funds, the journal printer may be operated by the processor to indicate only that the customer printed a transaction log.

The partial format for a printed receipt form for a card balance inquiry without the transaction log data is shown in FIG. 18. Of course, in an actual form the data taken from the integrated circuit chip will also be printed as part of this transaction log.

After completing the printing at step 9.2, the processor 26 is operative to move to step 9.3 at which a determination is made as to whether the card in the card reader is a funds card. For purposes of this example it is assumed that it is a funds card, and the processor moves to step 9.4. At step 9.4 the customer is again prompted to indicate whether they wish to conduct another transaction. Assuming that the customer indicates that they do not wish to conduct another transaction by pressing function button F8, the processor is operative to eject the card at step 9.8 and to display the courtesy "thank you" screen shown at step 10.0.

While the load, unload, funds account inquiry and card balance inquiry transactions are examples of transactions that may be carried out through the system of the present invention, it should be understood that these transactions are exemplary and that the system may also be configured to carry out other types of transactions using smart cards, magnetic stripe cards or other types of access cards.

As transactions are conducted using the system, information concerning the transactions that have been conducted at a terminal device 12 is stored in memory 28. To properly distribute funds among the operators of the various transaction hosts, the operator of the terminal devices, and customers who use the terminal devices, settlement must eventually be accomplished. In order to achieve settlement the terminal device is configured to forward its settlement data on a periodic basis to a designated host computer referred to as a settlement host. This settlement host and its associated phone number, as well as the date and time for settlement, are among the configurable data for the terminal device. This is represented, for example, in FIGS. 3 and 4 by location numbers 7 through 10 and 13 through 16. Of course, as indicted in the tables shown in these Figures, an alternative host computer is designated for settlement in the event that the first choice is not available.

A common time for settlement is at the end of each business day. The transaction flow between the terminal device and the settlement host is graphically represented in FIG. 26. In accordance with the terminal configuration, when the time arrives to accomplish settlement time processor 26 is operative to cause the modem 36 to dial the settlement host based on the data stored in the memory 28. Upon successfully contacting the host the terminal device is operative to send a settlement message to the host. After having sent the settlement message to the host, the terminal device disconnects.

The settlement message generally has the layout shown in FIG. 27. As indicated therein the settlement message is divided into various types of data records which correspond to particular types of transactions. Each group of data records is preceded by a batch header record for that group, and is followed by a batch trailer record for that particular group. In the preferred embodiment of the invention the data records include card issuance and refund transactions, goods and services transactions and card reload transactions.

The batch header record format for card issuance/refund transactions is shown in FIG. 28. The trailer record format for this group of transactions is shown in FIG. 31. The format and content layout of each transaction associated with card issuance or refund is shown with reference to FIGS. 29 and 30. It should be understood that the data shown in FIGS. 29 and 30 is present for each of the transactions of those types that have been conducted.

For goods and services transactions the header record format is shown in FIG. 32 and the trailer record format is shown in FIG. 34. The format for the records that are included in the settlement message for each transaction are shown in FIG. 33.

Similarly, the format used in the preferred embodiment for the batch header records associated with card reload transactions is shown in FIG. 35 and the trailer record format is shown in FIG. 37. The data record format associated with each of the transactions is shown in FIG. 36.

It should be understood that in the case of the terminal device 12, the records will consist of card issuance and refund transactions and card reload transactions. This is because the customers are not enabled to make purchases of goods or services through the terminal device. However, if the system were modified in a way such that the customer could purchase goods or services at the device, then such records could in alternative embodiments be included. It should also be noted that processor 26 is operative to maintain the transaction types separate and to sequentially number each transaction of each particular type. This facilitates building and sending the settlement message to the settlement host.

After receiving the settlement message data, the terminal device disconnects from the settlement host. The host proceeds to process the data so as to appropriately charge and credit the accounts of the participants in the system.

It should be noted that in the preferred embodiment of the present invention the terminal device is operative to initiate all contacts with the host computer through the phone system 40. As the terminal device does not receive incoming telephone inquiries, this minimizes the risk that persons will try to break into the terminal for nefarious purposes. In addition, the messages sent by the terminal through the phone system are preferably encrypted in accordance with designated known encryption programs and certain encryption keys. The encryption programs are stored in memory and the keys are stored as part of the terminal configuration. The keys are preferably periodically changed. The configuration key data is shown in the table in FIGS. 3 and 4 as associated with items 24 through 26.

A further fundamental advantage of the present invention is that an operator of the terminal device who is the systems administrator is enabled to readily configure the terminal with the values and information necessary for it to carry out proper operation. In the preferred embodiment, this can be done by the systems administrator using a smart card which has a memory which has a memory which includes all the terminal configuration data stored thereon. In addition, the systems operator is enabled to copy configuration data from the terminal device to a card so that the same configuration data may be loaded into other terminals. This may be valuable when the systems operator has several terminal devices that need to be programmed in the same manner. The terminal devices of the system also enable a systems operator to carry out settlement functions and other administrative functions manually as well as to print various types of reports.

The transaction flow for administrative functions that can be carried out at the terminal device 12 of the preferred embodiment are shown with reference to FIGS. 38, 39, 41, 42, 43, 45, 47, 49, 50, 51, 53, 54, 56, 57, 58, 60, 61, 63, 64, 66, 67 and 69. Of course, in alternative embodiments additional functions or a lesser selection of functions may be provided.

The transaction flow through which a system administrator gains access to the administrative functions of the terminal are represented by the steps and screen displays shown in FIGS. 38 and 39. These steps are carried out by the processor 26 in accordance with data stored in the memory 28. As shown in FIGS. 38 and 39, the systems administrator gains access through entry of a password to the terminal. This password may be changed once the administrator has entered the proper password. After the proper password is entered, the processor 26 is operative to display on screen 16 a list of administrative functions which are available. This list of administrative functions is shown in FIG. 40.

The various administrative functions will now be described. If the system administrator determines that the clock device within the terminal which tracks the time and date of transactions needs to be set, this is done in accordance with the portion of the transaction flow shown in FIG. 42. Another function that can be carried out by the administrator is to have a terminal device immediately send a settlement message to the transaction host. This is done by the systems administrator selecting the batch upload function and the processor 26 carrying out the steps shown in FIG. 41. Another function that can be carried out is to have the terminal device print a detail report of the transactions. This portion of the transaction flow is represented in FIG. 43 and a format for a report of the type that is printed is shown in FIG. 44.

Another administrative function which may be selected is to have the terminal device print a report of statistics. The step of printing such a report under the control of processor 26 is represented in FIG. 45 and a sample format for a report printed by the printer 30 of the terminal is shown in FIG. 46.

A further administrative function which may be selected is to have the terminal print totals of transactions that have been conducted. This is represented by the portion of the transaction flow shown in FIG. 47. A sample report which is printed during this operation is shown in FIG. 48. If the systems administrator wishes to clear the records of transactions totals and statistics which are currently being stored in memory 28 of the terminal, the portion of the transaction flow shown in FIG. 49 is carried out.

The administrative functions also enable the administrator to review the configuration data stored in the memory 28 of the terminal and to modify the configuration data. The transaction flow associated with the administrative function which accesses terminal configuration data is shown in FIG. 50. If the system administrator wishes to have the terminal print the configuration data, this administrative function may be selected and the terminal will carry out a printing operation in accordance with the portion of the transaction flow shown in FIG. 51. The sample report format for the configuration data which is printed in the preferred embodiment is shown in FIG. 52.

In accordance with the exemplary customer transactions previously discussed, the processor is operative to cause screen 16 to present various types of displays or prompts to the customer. These prompts instruct the customer to make certain selections. The administrator is enabled to access the prompt configuration data through the portion of the transaction flow shown in FIG. 53. A further administrative function which includes the portion of the transaction flow shown in FIG. 54, enables the administrator to print the prompt configuration. The prompt configuration report format printed by the terminal is represented in FIG. 55.

As also discussed in accordance with the exemplary transaction flows for loading and unloading value, from a smart card, the response messages sent by the transaction host include a state number which is indicative of whether the transaction will go forward. If for some reason the transaction cannot be carried out, the response message from the transaction host will include a state number which does not allow the transaction to go forward. What the terminal device does in response to state numbers in response messages which indicate an "error", is determined by error configuration data stored in the memory 28 of the terminal. The system administrator is enabled to access the error configuration and to change what the terminal device does in response to receiving the state data through the transaction flow portion shown in FIGS. 56 and 57. The system administrator is also enabled to select the administrative function to print the error configuration data which is represented by the portion of the transaction flow shown in FIG. 58. The error configuration report which is printed has a format shown in FIG. 59.

As previously discussed with reference to load and unload transactions, the configuration data within the terminal device 12 also includes information on whether the accounts associated with the customer's smart card, credit card or debit card is one that the system can process. This is determined in accordance with configuration data stored in the terminal. FIG. 60 shows the transaction flow associated with the administrative function in which the administrator stores in the terminal device the bank institution number (BIN) for the institutions whose smart cards can be processed by the terminal. In the case of the preferred embodiment, these values correspond to the VISA™ Cash Cards (VCC). The administrative function associated with printing the "on us" configuration data is shown with reference to the portion of the transaction flow shown in FIG. 61. The format of the report printed with this configuration data is shown in FIG. 62.

As was previously explained, the processing of load and unload transactions also involves determining whether the system can process transactions involving accounts at institutions whose identities are indicated in the magnetic stripe data. This data also indicates the manner in which the data must be encoded or encrypted in order to be properly decoded by the transaction host. As previously described in connection with the exemplary transactions, this involves the financial institution table (FIT) data stored in the memory 28. An administrative function available in the preferred embodiment enables the system administrator to access this configuration data. The portion of the transaction flow associated with accessing and changing this data is represented in FIG. 63. The system administrator is also enabled to print a report of the FIT configuration data and this is represented by the portion of the transaction flow shown in FIG. 64. The report printed by the terminal device concerning this data has the format shown in FIG. 65.

A fundamental advantage of the preferred embodiment of the present invention is that configuration data may be stored in a memory on an administrator's smart card. A table showing the configuration data which may be stored on a card is shown in FIG. 68. One of the administrative functions available in the terminal device enables the administrator to read the terminal configuration data that is stored on an administrator's smart card. This is accomplished through the portion of the transaction flow shown in FIG. 66. An administrator is also enabled to update the terminal configuration for the terminal device based on the configuration data read from the card. An administrative function also enables an administrator to print out a report from the printer 30 of the terminal device showing the configuration data printed on the administrator's card. This is represented by the portion of the transaction flow shown in FIG. 67.

To facilitate an administrator's ability to program other terminal devices quickly, an administrator is also enabled in the preferred embodiment of the invention, to write the terminal configuration data stored in a terminal device to the memory on a smart card. This is carried out through a portion of the transaction flow shown in FIG. 69. Once the administrator has copied the terminal configuration data on to a smart card, the administrator may then use the same card to program other terminal devices in a similar manner. This approach may also be used with various types of terminal devices such as ATMs, POS terminals and other terminals which may be programmed in a similar manner.

Of course, the foregoing administrative functions are exemplary and other types of administrative functions may be provided in other embodiments.

As will be appreciated from the foregoing discussion, the preferred embodiment of the system of the present invention provides a versatile system for loading and unloading value from smart cards while transferring value between accounts. The card operates as a "purse" from which money can be taken and into which money may be added. The system also uses a unique series of transaction message formats that are suitable for communicating the data necessary to carry out the transactions accomplished by the system. This includes both customer transactions as well as settlement between the participants in the system.

Thus, the new electronic purse card value system of the preferred embodiment of the present invention achieves the above-stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function and not merely the means described in the foregoing description as performing the recited function, or mere equivalents thereof.

Having described the features, discoveries and principles of the invention, the manner in which it is constructed and operated and the advantages and useful results attained, the new and useful structures, devices, elements, arrangements, parts, combinations, systems, equipment, operations and relationships are set forth in the appended claims.

We claim:

1. A method comprising the steps of:
    storing a first value in a first area of a card memory of a smart card, the first value representative of a first type of data;
    storing a second value in a second area of the card memory, the second value representative of a second type of data;
    calculating a third value, the third value being a function of both the first value and the second value; and
    storing the third value in the card memory of the smart card as an integrity check.

2. The method according to claim 1 and further comprising the steps of:
    reading the first, second and third values from the card memory with a terminal device; enabling further operation of the terminal device responsive to the third value read from the smart card corresponding to both the first and second values read.

3. The method according to claim 1 wherein the first type of data is representative of a whole currency amount, and the second type of data is representative of a partial currency amount, and wherein in the calculating step the third value is a function of both the whole currency amount and the partial currency amount.

4. The method according to claim 3 and further comprising the steps of:
    reading the first, second and third values from the card memory with a terminal device;
    determining with the terminal device that the third value read from the card corresponds to the first and second values read from the card;
    receiving a first unload instruction input at the terminal device;
    receiving a first unload value input at the terminal device, the first unload value input including a first whole currency amount; and
    changing the first memory area of the card with the terminal device to include a new first value, the new first value corresponding to the first value increased by the first whole currency amount.

5. The method according to claim 4 further comprising the steps of:
    calculating a new third value with the terminal device, the new third value being a function of both the new first value and the second value; and
    storing the new third value in the card memory of the smart card.

6. The method according to claim 3 and further comprising the steps of:
    reading the first, second and third values from the card memory with a terminal device;
    determining with the terminal device that the third value read corresponds to the first and second values read;
    receiving a first load instruction input at the terminal device;
    receiving a first load value input at the terminal device, the first load value input including a first whole currency amount; and
    changing the first memory area of the card with the terminal device to include a new first value, the new first value corresponding to the first value increased by the first whole currency amount.

7. The method according to claim 6 further comprising the steps of:
    calculating a new third value with the terminal device, the new third value being a function of both the new first value and the second value; and
    storing the new third value in the card memory of the smart card.

8. The method according to claim 1 wherein the first area of the card memory includes a first plurality of first bits, and wherein each of the first bits represents a first monetary unit value, and wherein the first value comprises a first number of first monetary units, and wherein the step of storing the first value includes changing the first bits to correspond to the first number of first monetary units comprising the first value.

9. The method according to claim 8 wherein the second area of the card memory includes a second plurality of second bits, and wherein each of the second bits represents a second monetary unit value, and wherein the second value comprises a second number of second monetary units, and wherein the step of storing the second value includes changing the second bits to correspond to the second number of second monetary units comprising the second value.

10. The method according to claim 9 wherein the first monetary unit value corresponds to dollars and the second monetary unit value corresponds to cents, wherein in the calculating step the third value is a function of both dollars and cents represented in the smart card memory.

11. The method according to claim 1 wherein the first type data is representative of a first currency amount and the second type data is representative of a second currency amount, and further comprising the steps of:
    reading the first, second and third values from the card memory with the terminal device;
    determining with the terminal device that the third value corresponds to both the first and the second values;
    receiving an unload all instruction at the terminal device; and
    changing both the first memory area and the second memory area of the card to correspond to a zero value.

12. The method according to claim 11 and further comprising the step of generating an unload message with the terminal device, the unload message including an unload value representative of the sum of the first and second currency amounts.

13. The method according to claim 1 wherein the first type data is representative of a first currency amount and the second type data is representative of a second currency amount, and further comprising the steps of:

storing a maximum permissible total card value in a terminal memory of a terminal device;

reading the first, second and third values from the card memory with the terminal device;

determining with the terminal device that the third value corresponds to both the first and second values read from the card;

receiving a maximum load instruction at the terminal device; and changing both the first memory area and the second memory area of the card to data representative of a new first currency amount and a new second currency amount respectively, wherein a sum of the new first currency amount and the new second currency amount is equal to the maximum permissible total card value.

14. The method according to claim 13 and further comprising the steps of:

calculating a new third value with the terminal device from both the new first value and the now second value; and storing the new third value in the card memory of the smart card.

15. The method according to claim 13 and further comprising the step of generating a load message with the terminal device, the load message including a load value representative of a difference between the maximum permissible total card value and a further sum, wherein the further sum corresponds to the first currency amount plus the second currency amount.

* * * * *